US012173561B2

(12) United States Patent
Dormanen

(10) Patent No.: US 12,173,561 B2
(45) Date of Patent: Dec. 24, 2024

(54) STABILIZING DEVICE

(71) Applicant: DORMATEX GROUP LLC, Maple Lake, MN (US)

(72) Inventor: Shawn Dormanen, Maple Lake, MN (US)

(73) Assignee: DORMATEX GROUP LLC, Maple Lake, MN (US)

( * ) Notice: Subject to any disclaimer, the term of this patent is extended or adjusted under 35 U.S.C. 154(b) by 0 days.

(21) Appl. No.: 18/622,160

(22) Filed: Mar. 29, 2024

(65) Prior Publication Data

US 2024/0328256 A1 Oct. 3, 2024

Related U.S. Application Data

(60) Provisional application No. 63/493,989, filed on Apr. 3, 2023.

(51) Int. Cl.
*E06C 7/46* (2006.01)

(52) U.S. Cl.
CPC .................................... *E06C 7/46* (2013.01)

(58) Field of Classification Search
CPC .. E06C 7/46; E04G 3/265; E04G 3/26; E04G 3/34
See application file for complete search history.

(56) References Cited

U.S. PATENT DOCUMENTS 5,263,551 A * 11/1993 Andersen ................ E04D 15/00 182/129
5,791,438 A * 8/1998 Kempton ................ E06C 7/426 182/45
6,793,041 B1 * 9/2004 Taylor ........................ E06C 7/44 182/129
7,784,751 B1 * 8/2010 Bellows ................. A47B 91/00 248/346.11
8,448,746 B2 * 5/2013 Davis, Jr. ................ E04D 15/00 182/45
8,939,415 B2 * 1/2015 Dillinger ................ F16M 13/02 248/237
9,493,955 B1 * 11/2016 Christian ................ E04D 13/10
9,717,336 B1 * 8/2017 Apple ....................... A47C 3/04
(Continued)

FOREIGN PATENT DOCUMENTS

GB 2156415 A * 10/1985 ............... E06C 7/46
GB 2390391 A * 1/2004 ............... E06C 7/42
(Continued)

*Primary Examiner* — Eret C McNichols
(74) *Attorney, Agent, or Firm* — Gallium Law; Wesley Schwie; Isabel Fox

(57) ABSTRACT

The disclosure includes a stabilizing device comprising a shell and a base located on a bottom portion of the shell, wherein the base may be configured to contact a ground surface. In some embodiments, the stabilizing device includes a first face extending at an angle with respect to the base, the first face comprising a first upper ledge and a first lower section, a second face extending at an angle with respect to the base and the first face, the second face comprising a second upper ledge and a second lower section. In some embodiments, the first and second face are configured to support at least one object. The stabilizing device may include a foot located along the base and a foam rubber pad configured to removably couple to the foot.

20 Claims, 26 Drawing Sheets

(56) References Cited

U.S. PATENT DOCUMENTS

| | | | | | |
|---|---|---|---|---|---|
| 9,816,279 | B2 * | 11/2017 | Bond | E04G 3/26 | |
| 10,844,616 | B2 * | 11/2020 | Rashid | E04D 15/02 | |
| D948,753 | S * | 4/2022 | Rashid | D25/133 | |
| D948,754 | S * | 4/2022 | Rashid | D25/133 | |
| D960,396 | S * | 8/2022 | Rashid | D25/133 | |
| D970,051 | S * | 11/2022 | Rashid | D25/133 | |
| D970,052 | S * | 11/2022 | Rashid | D25/133 | |
| D977,683 | S * | 2/2023 | Rashid | D25/133 | |
| 11,603,675 | B2 * | 3/2023 | Nichols | A62B 35/0068 | |
| D983,411 | S * | 4/2023 | Rashid | D25/62 | |
| D983,412 | S * | 4/2023 | Rashid | D25/62 | |
| D984,680 | S * | 4/2023 | Rashid | D25/138 | |
| D1,007,007 | S * | 12/2023 | Rashid | D25/62 | |
| 11,866,996 | B2 * | 1/2024 | Horton | E06C 7/46 | |
| D1,019,993 | S * | 3/2024 | Rashid | D25/133 | |
| D1,022,253 | S * | 4/2024 | Rashid | D25/62 | |
| 2006/0226310 | A1 * | 10/2006 | Hall | E04D 15/02 | 248/148 |
| 2010/0213005 | A1 * | 8/2010 | Sistonen | E04G 3/265 | 248/237 |
| 2018/0334814 | A1 * | 11/2018 | Rashid | E04D 13/12 | |
| 2019/0217989 | A1 | 7/2019 | Smith et al. | | |
| 2021/0087836 | A1 | 3/2021 | Rashid et al. | | |
| 2021/0180342 | A1 * | 6/2021 | Rashid | E04G 3/265 | |
| 2022/0056716 | A1 * | 2/2022 | Nichols | A62B 35/0068 | |
| 2022/0282502 | A1 * | 9/2022 | Rashid | E04G 3/265 | |
| 2023/0032156 | A1 * | 2/2023 | Horton | E06C 7/46 | |

FOREIGN PATENT DOCUMENTS

| | | | | |
|---|---|---|---|---|
| GB | 2445359 | A * | 7/2008 | E06C 7/42 |
| JP | 2008019603 | A | 1/2008 | |

* cited by examiner

STABILIZING DEVICE

CROSS-REFERENCE TO RELATED APPLICATIONS

The present application claims priority to U.S. Provisional Patent Application No. 63/493,989 filed on Apr. 3, 2023, entitled "STABILIZING DEVICE" the entire disclosure of which is incorporated by reference herein.

The present invention relates to tools and equipment. Using a ladder on both flat and sloped surfaces presents numerous safety challenges and inefficiencies, the primary concern being stability. Ladders are designed for use on level ground. When in use, ladders can easily slip or shift, leading to accidents and injuries. Moreover, it's difficult to maintain proper balance while ascending or descending an inclined ladder, increasing the risk of falls. Another issue is the limited reach and access. When positioned on a slope, the effective height of the ladder decreases, making it challenging to reach high places safely. This limitation may compel individuals to overreach or lean too far, further jeopardizing their stability. Additionally, using a ladder on a sloped surface can cause undue strain on the ladder itself, potentially leading to structural damage or failure. The uneven pressure distribution may weaken the ladder's integrity over time, compromising its safety.

SUMMARY OF THE INVENTION

The disclosure includes a stabilizing device comprising a shell, a base located on a bottom portion of the shell, the base configured to contact a ground surface, a first face extending at an angle with respect to the base and comprising a first upper ledge comprising a first textured surface and a first lower section comprising a second textured surface, a second face extending at an angle with respect to the base and the first face and comprising a second upper ledge comprising a third textured surface and a second lower section comprising a fourth textured surface. In some embodiments, the first and second face are configured to support at least one object.

The stabilizing device may further include a foot located along the base and a foam rubber pad removably coupled to the foot. In some embodiments, the foam pad is arranged and configured to create a suction-like seal with the ground surface when the foam rubber pad is compressed and to slide along the ground surface when the foam rubber pad is not compressed.

The stabilizing device may further include a plate mechanically coupled to the foot. In some embodiments, the plate is located between the foot and the foam rubber pad. The foam rubber pad may be removably coupled to the base via a hook and loop connection. In some embodiments, the hook and loop connection comprises a hook connection injection molded into the plate and a loop connection adhesively coupled to the foam rubber pad.

According to some embodiments of the stabilizing device, the first textured surface, second textured surface, third textured surface, and fourth textured surface each comprise a plurality of raised portions. In some embodiments, the first textured surface, the second textured surface, the third textured surface, and the fourth textured surface comprise substantially the same pattern. The first textured surface, the second textured surface, the third textured surface, and the fourth textured surface may comprise different patterns.

The stabilizing device may further comprise a first left upper ledge portion and a first right upper ledge portion spaced from the first left upper ledge portion, and a first left lower section portion and a first right lower section portion spaced from the first left lower section portion. In some embodiments, the stabilizing device comprises a second left upper ledge portion and a second right upper ledge portion spaced from the second left upper ledge portion, and a second left lower section portion and a second right lower section portion spaced from the second left lower section portion.

The stabilizing device may further comprise an internal support structure located within the shell. In some embodiments, the internal support structure comprises a bolster configured to provide support to at least one of the first left lower section portion, the first right lower section portion, the second left lower section portion, and the second right lower section portion. The bolster may extend from the foot to an internal portion of at least one of the first left lower section portion, the first right lower section portion, the second left lower section portion, and the second right lower section portion.

In some embodiments, the first left upper ledge portion and the first right upper ledge portion define a first angle with respect to the base. The first left lower section portion and the first right lower section portion may define a second angle with respect to the base. In some embodiments, the second left upper ledge portion and the second right upper ledge portion define a third angle with respect to the base. The second left lower section portion and the second right lower section portion may define a fourth angle with respect to the base. The first angle may be about 39 degrees, the second angle may be about 15 degrees, the third angle may be about 50 degrees, and the fourth angle may be about 25 degrees.

The stabilizing device may further comprise a first middle portion located along the first face and between the first left upper ledge portion and the first right upper ledge portion and between the first left lower section portion and the first right lower section portion. In some embodiments, the stabilizing device further comprises a second middle portion located along the second face and between the second left upper ledge portion and the second right upper ledge portion and between the second left lower section portion and the second right lower section portion. The stabilizing device may further comprise a first recessed surface located within the first middle portion. In some embodiments, the first recessed surface comprises a rounded recessed surface. The stabilizing device may further comprise a second recessed surfaced located within the second middle portion. In some embodiments, the second recessed surface comprises a rectangular recessed surface.

The stabilizing device may further comprise a first handle located within the first middle portion and between the first left upper ledge portion and the first right upper ledge portion. The stabilizing device may further comprise a second handle located within the second middle portion and between the second left upper ledge portion and the second right upper ledge portion.

In some embodiments, the stabilizing device further comprises a gap located along the base and extending from the first face to the second face. The gap may be arranged and configured to receive a metal roof seam. In some embodiments, the gap comprises a first gap. The stabilizing device may further comprise a second gap located along the base and extending from the first face to the second face. In some embodiments, the first gap is spaced from the first gap. The stabilizing device may further comprise a third gap located along the base and extending from the first face to the second face. The third gap may be spaced from the first gap and the second gap. According to some embodiments, the first gap is located between the second and third gap such that the first gap, the second gap, and the third gap are arranged and configured to receive a metal roof having a 12-inch seam and a metal roof having a 16-inch seam.

According to some examples, the foot is a first foot. The stabilizing device may further comprise a second foot spaced from the first foot along a first direction, a third foot spaced from the second foot along the first direction, and a fourth foot spaced from the third foot along the first direction. In some embodiments, the stabilizing device further comprises a fifth foot spaced from the first foot along a second direction perpendicular to the first direction; a sixth foot spaced from the fifth foot along the first direction, and spaced from the second foot along the second direction; a seventh foot spaced from the sixth foot along the first direction, and spaced from the third foot along the second direction; and an eighth foot spaced from the seventh foot along the first direction and spaced from the fourth foot along the second direction.

The stabilizing device may further comprise a first side wall extending from the first foot and the fifth foot to a first apex of the stabilizing device and a second side wall extending from the fourth foot and the eighth foot to a second apex of the stabilizing device. According to some embodiments, the second apex is located opposite the first apex and the second side wall is located opposite the first side wall. The stabilizing device may further comprise a horizontal recessed portion extending along the first direction from the first side wall to the second side wall and located between the first foot and the fifth foot, the second foot and the sixth foot, the third foot and the seventh foot, and the fourth foot and eighth foot.

The foregoing, and other features and advantages of the invention will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

Figure 1:
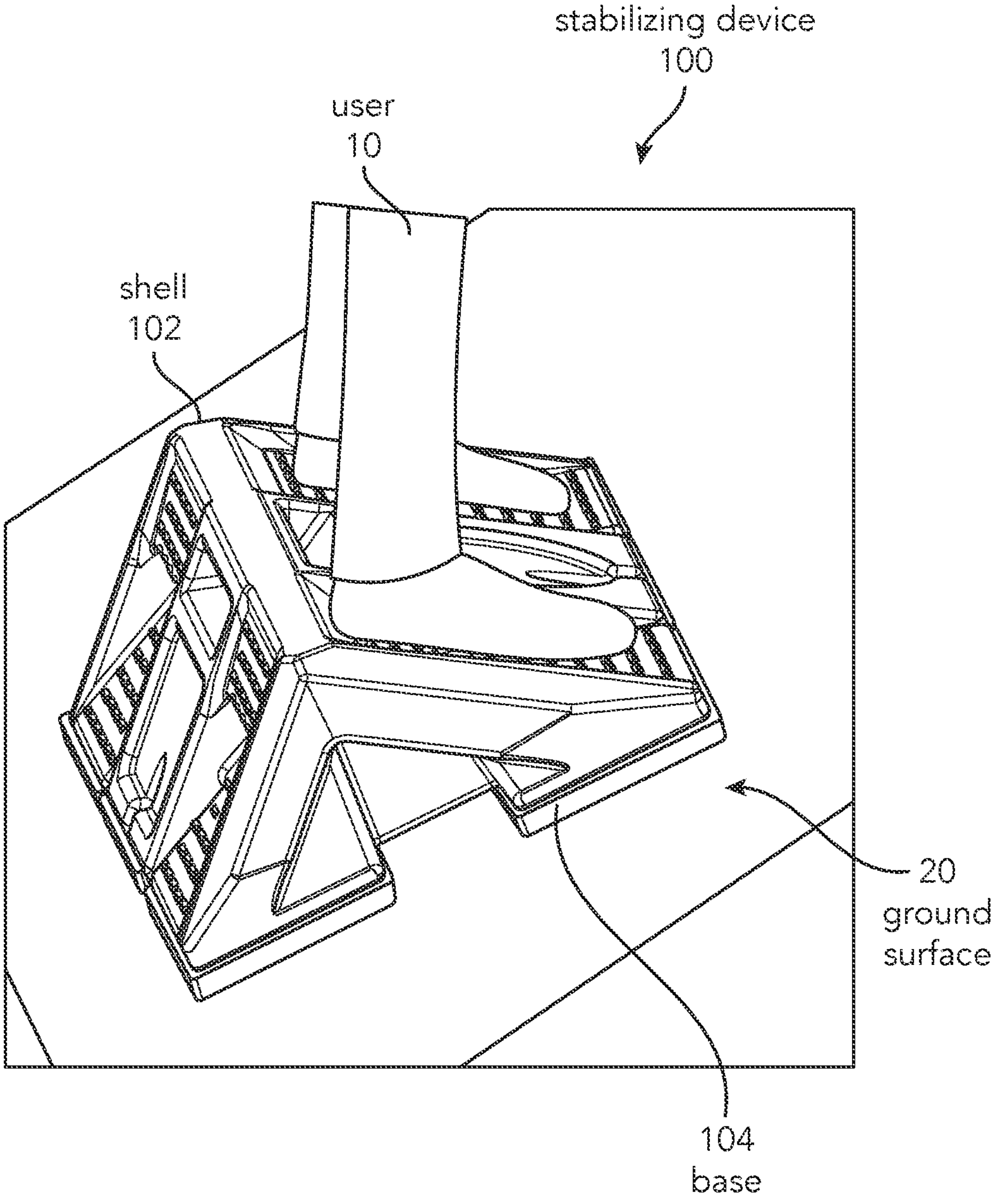
FIG. 1 illustrates a perspective view of a stabilizing device in use, according to some embodiments.

10—user
20—ground surface
20*a*—ground surface
20*b*—ground surface
30—object
100—stabilizing device
102—shell
104—base
202—first face
204—first upper ledge
206—first textured surface
208—first lower section
210—second textured surface
212—second face
214—second upper ledge
216—third textured surface
218—second lower section
220—fourth textured surface
222—plurality of raised portions
302—first upper ledge portion
302*a*—first left upper ledge portion
302*b*—first right upper ledge portion
304—first lower section portion
304*a*—first left lower section portion
304*b*—first right lower section portion

306—second upper ledge portion
306*a*—second left upper ledge portion
306*b*—second right upper ledge portion
308—second lower section portion
308*a*—second left lower section portion
308*b*—second right lower section portion
402—first angle
404—second angle
502—third angle
504—fourth angle
602—first middle portion
604—first recessed surface
606—first handle
608—second middle portion
610—second recessed surface
612—second handle
702—bottom portion
704—foot
704*a*—first foot
704*b*—second foot
704*c*—third foot
704*d*—fourth foot
704*e*—fifth foot
704*f*—sixth foot
704*g*—seventh foot
704*h*—eighth foot
802—internal support structure
804—bolster
806—internal portion (of first lower section portion)
808—internal portion (of second lower section portion)
902—foam rubber pad
1002—plate
1004—hook connection
1006—attachment mechanism
1402—loop connection
1404—bottom surface (of plate)
1406—top surface (of foam rubber pad)
1502—plate
1504—intermediary panel
1506—attachment mechanism
1602—plate protrusion
1604—panel aperture
1702—gap
1704—roof
1706—roof seam
1800—stabilizing device
1802*a*—first gap
1802*b*—second gap
1802*c*—third gap
1804—base
1806—roof seam
1808—roof
1902—first side wall
1904—second side wall
1906—horizontal recessed portion
2002—first apex
2004—second apex
2302—first width
2304—second width
2502—label area
2502*a*—first label area
2502*b*—second label area
2502*c*—third label area
2502*d*—fourth label area
2502*e*—fifth label area
2502*f*—sixth label area
2502*g*—seventh label area
2502*h*—eighth label area
2502*i*—ninth label area

DETAILED DESCRIPTION OF THE INVENTION

Ladders are an indispensable tool for accessing areas above ground level. Extendable type ladders are useful for accessing even greater heights yet are inherently risky to use for both homeowners and professionals alike. Accidents arising from the use of ladders are commonly known and well-documented. Many of these accidents are due to movement or slipping at the base of the ladder caused by a lack of traction with the surface on which the ladder feet are placed. Other accidents happen when ladders tip sideways while working on unlevel terrain. Most ladders in use today have very little surface contact area at the base of the ladder's feet. The lack of surface contact area and grip with the surface (e.g., ground, roof, and the like) can result in the base of the ladder slipping unintentionally, causing harm to the user.

The recommended working angle for an extendable type of ladder is around 75 degrees vertically. This angle is recommended because it keeps the user's weight and center of gravity closely in line vertically with the ladder's feet. However, working conditions do not always allow a ladder to be placed at this ideal angle. In addition to working with undesirable angles, ladder users often have to deal with difficult, slippery, or delicate types of flooring or ground surfaces.

At times, a ladder must be used indoors and positioned upon finished flooring such as wood, laminate, tile, or vinyl. These flooring surfaces are subject to scratches and other damage without a protective barrier between the base of the ladder's feet and the flooring below. Other times, a ladder must be utilized outdoors and positioned upon exterior surfaces such as decks, patios, grass, sidewalks, or driveways, which may be subject to varying conditions such as rain, snow, ice, and the like. Wood or composite decking can especially be subject to scratches and other damage without a protective barrier between the base of the ladder's feet and the decking surface. The use of protective barriers, both inside and outside, can pose additional risks due to the increased potential for slipping if the protective barrier loses traction with the floor/ground surface.

Another common outdoor ladder placement is on sloping terrain, such as a sloped driveway or yard. On a slope, a ladder must sometimes be positioned so that one of the ladder's feet is placed on the upper side of the slope, while the other ladder foot is suspended in the air with no ground contact or support. This can result in the ladder shifting from side to side, and thus tipping over. Additionally, sometimes a ladder is positioned on top of a lower-pitched roof surface to access an upper level of a multi-story building. Placing a ladder on a pitched roof is not ideal due to the obvious downward slope, and lack of stability with the base of the ladder. Further, sloped surfaces present difficulties in stabilizing not only ladders, but also tools, materials, and users themselves.

Over the years, devices have been developed and brought to market in attempts to solve issues presented by difficult ladder placements and positions referenced above. However, most of these devices serve a singular function, thereby providing a singular solution. Based on the foregoing, there is a need in the art for a versatile, portable stabilizing device that could be used to distribute weight more evenly and increase the overall footprint and surface contact area on virtually any substrate or slope—both indoors and out.

FIG. 1 shows a perspective view of a stabilizing device 100 supporting a user 10 on a ground surface 20. As illustrated, the ground surface 20 may be a non-level (i.e., sloped) surface. In some embodiments, the stabilizing device 100 defines a generally triangular (i.e., scalene triangle), or wedge, shape and, when placed on a sloped surface, provides a substantially level surface for a user 10 to stand on. The stabilizing device 100 may provide surface that is not substantially level, but is closer to level and defines less of a slope than the ground surface 20. A triangular wedge-shaped stabilizing device 100 may be helpful to support a user 10 when used on surfaces such as a sloping side yard, roof, or ramp. It should be noted, however, that the stabilizing device 100 may define any number of suitable shapes other than a triangular wedge shape.

The stabilizing device 100 may also be used on flat surfaces, such as a substantially level indoor floor or outdoor ground surface 20. In some embodiments, when used on a flat surface, the stabilizing device 100 increases the surface area of the user 10 and provides additional traction between the user 10 and the flat surface. This may be especially helpful when the flat surface is a wet or slippery surface.

The stabilizing device 100 may include a shell 102 and a base 104. In some embodiments, the base 104 is located on a bottom portion of the shell 102 and is configured to contact the ground surface 20. The shell 102 may be constructed of any type of lightweight, rigid, impact-resistant plastic, including, but not limited to, high-density polyethylene ("HDPE") or medium-density polyethylene ("MDPE"). The shell 102 may be made of a material or combination of materials other than plastic. In some embodiments, the shell 102 is made via any number of suitable processes, including, but not limited to, molding processes such as rotational molding or structural foam molding.

The stabilizing device may also be used to support other equipment or tools, such as a ladder, toolbox, tool bucket, work table/bench, individual tools or hardware, paint can, or the like. In some embodiments, using the stabilizing device 100 helps distribute the weight of an object or user 10 across a flat or sloped surface, such as a roof, as compared to just placing that object or user 10 directly on the surface. Distribution of weight may help reduce the chances of damaging the roof or another surface. The stabilizing device 100 may be used on any type of surface such as, but not limited to, pavement, grass, decking, various types of roofing, and indoor surfaces like tile, wood, carpet, laminate, and the like.

Figure 2A:
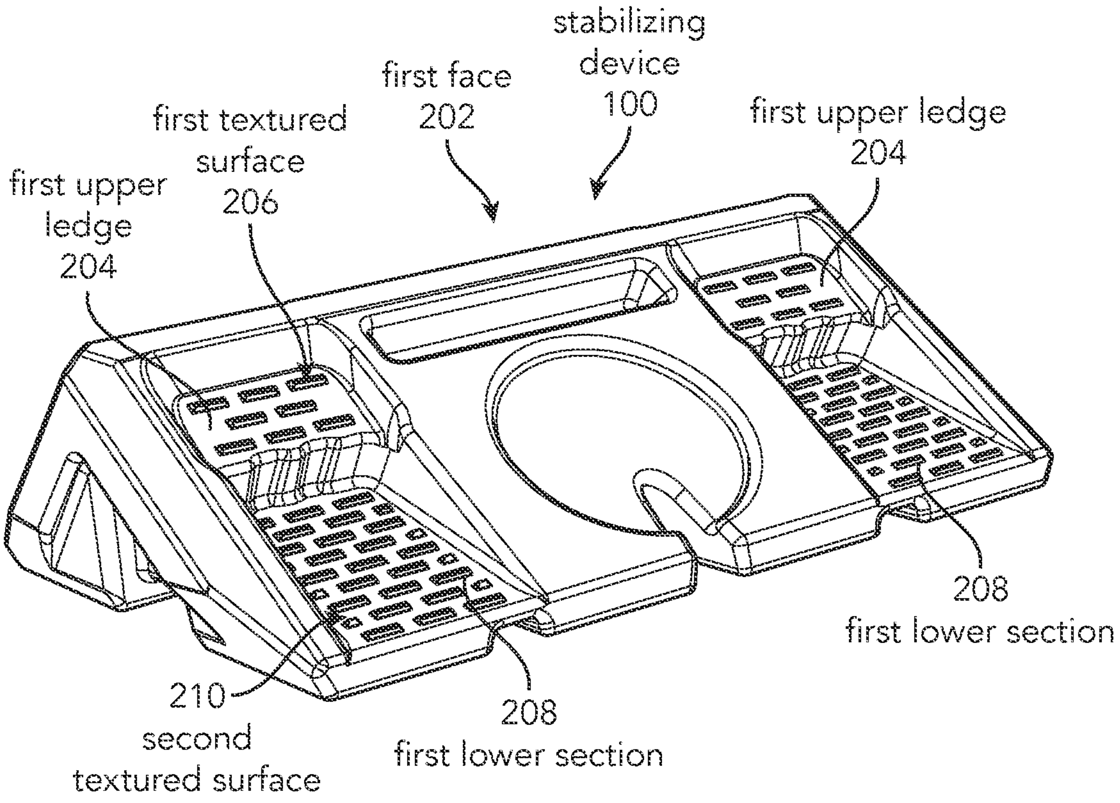
FIGS. 2A and 2B illustrate perspective views of a first face and a second face of the stabilizing device, respectively, according to some embodiments.
Figure 2B:
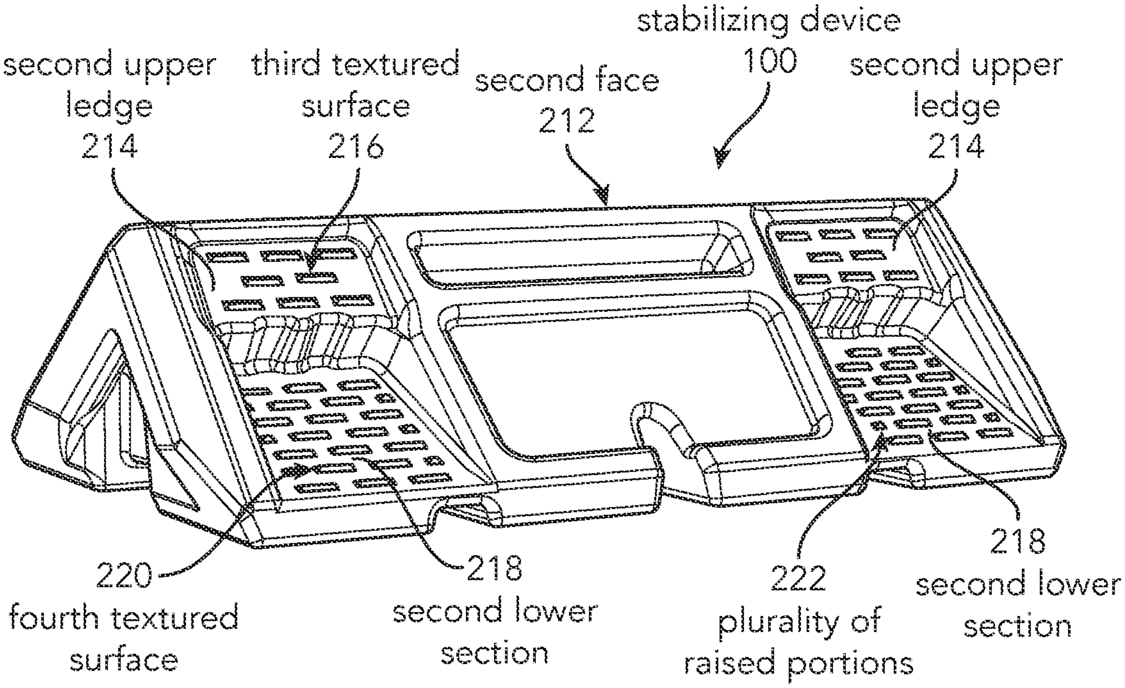

In some embodiments, the stabilizing device 100 includes a first face 202 and a second face 212, as shown in FIGS. 2A and 2B, respectively. It should be noted that though the "first face 202" and "second face 212" reference labels include arrows pointing toward a middle portion of each face, the term "first face 202" and "second face 212" may be used to refer to substantially the entire relevant face of the stabilizing device 100.

FIG. 2A illustrates a perspective view of the first face 202, which may be configured to extend at an angle with respect to the base 104, as will be discussed further with reference to FIGS. 4A and 4B. In some embodiments, the first face 202 is configured to support at least one object, such as the user 10 shown in FIG. 1, and provide a substantially level surface when the stabilizing device 100 is placed on a non-level ground surface 20. As shown, the first face 202 may include a first upper ledge 204 and a first lower section 208. As demonstrated in FIG. 2A, the first upper ledge 204 may include a first textured surface 206. In some embodiments, the first lower section 208 includes a second textured surface 210. The first textured surface 206 and the second textured surface 210 may be configured to provide a non-slip surface on the first face 202. The first textured surface 206 may define substantially the same pattern as the second textured surface 210. In some embodiments, the first textured surface 206 defines a different pattern than the second textured surface 210.

When the first face 202 supports a user 10, as shown in FIG. 1, the first upper ledge 204 may be configured to receive a heel of the foot of the user 10, while the toes of the foot of the user 10 extend toward the first lower section 208. In some embodiments, the first upper ledge 204 is configured to receive the toes of the user 10, while the first lower section 208 receives the heel of the user 10.

In some embodiments, the stabilizing device 100 is configured to receive a ladder. When the first face 202 supports a ladder, the ladder feet may be received by the first lower section 208, with the first upper ledge 204 acting as a backstop for the ladder feet. As a backstop, the first upper ledge 204 provides support to the ladder feet, preventing the feet from moving off the first lower section 208. In some embodiments, the first upper ledge 204 rises about 1.5 inches above the first lower section 208, providing a 1.5-inch tall backstop. The relatively lower height of the first lower section 208, as compared to the first upper ledge 204, may also lower the center of gravity of the ladder with respect to the stabilizing device 100, thereby making the ladder more secure on the stabilizing device 100 and making the stabilizing device 100 less likely to tip over.

FIG. 2B illustrates a perspective view of a second face 212 of the stabilizing device 100 which may be configured to extend at an angle with respect to the base 104, as will be discussed further with reference to FIGS. 5A and 5B. The second face 212 may be configured to support at least one object, such as the user 10 shown in FIG. 1, and provide a substantially level surface when the stabilizing device 100 is placed on a non-level ground surface 20. As shown, the second face 212 may include a second upper ledge 214 and a second lower section 218. As demonstrated in FIG. 2B, the second upper ledge 214 may include a third textured surface 216. In some embodiments, the second lower section 218 includes a fourth textured surface 220. The third textured surface 216 and the fourth textured surface 220 may be configured to provide a non-slip surface on the second face 212. The third textured surface 216 may define substantially the same pattern as the fourth textured surface 220. In some embodiments, the third textured surface 216 defines a different pattern than the fourth textured surface 220.

When the second face 212 supports a user 10, as shown in FIG. 1, the second upper ledge 214 may be configured to receive a heel of the foot of the user 10, while the toes of the foot of the user 10 extend toward the second lower section 218. Conversely, the second upper ledge 214 may be configured to receive the toes of the user 10, while the second lower section 218 receives the heel of the user 10.

The stabilizing device 100 may be configured to receive a ladder. When the second face 212 supports a ladder, the ladder feet may be received by the second lower section 218, with the second upper ledge 214 acting as a backstop for the ladder feet. As a backstop, the second upper ledge 214 provides support to the ladder feet, preventing the feet from moving off the second lower section 218. In some embodiments, the second upper ledge 214 rises around 1.5 inches above the second lower section 218, providing a 1.5-inch tall backstop. The relatively lower height of the second lower section 218, as compared to the second upper ledge 214, may also lower the center of gravity of the ladder with respect to the stabilizing device 100, thereby making the ladder more secure on the stabilizing device 100 and making the stabilizing device 100 less likely to tip over.

In some embodiments, the first textured surface 206, the second textured surface 210, the third textured surface 216, and the fourth textured surface 220 are made up of a plurality of raised portions 222. The plurality of raised portions 222 may be made of the same material as the shell 102. The plurality of raised portions 222 in the first textured surface 206, the second textured surface 210, the third textured surface 216, and the fourth textured surface 220 may define substantially the same pattern. Any one or a combination of the first textured surface 206, the second textured surface 210, the third textured surface 216, and the fourth textured surface 220 may define a different pattern from one another.

The first textured surface 206, the second textured surface 210, the third textured surface 216, and the fourth textured surface 220 may include horizontal lines, vertical lines, or any of the other suitable lines and textures that enable objects to stand and stay without sliding or falling off the stabilizing device 100 by increasing traction between the object and the relevant surface (i.e., first upper ledge 204, the first lower section 208, the second upper ledge 214, and/or the second lower section 218). The "object" may include any number of objects including, but not limited to, a ladder, a person, a bucket, at least one tool, a work table, a stack of roof shingles, other supplies/equipment, and the like.

Figure 3A:
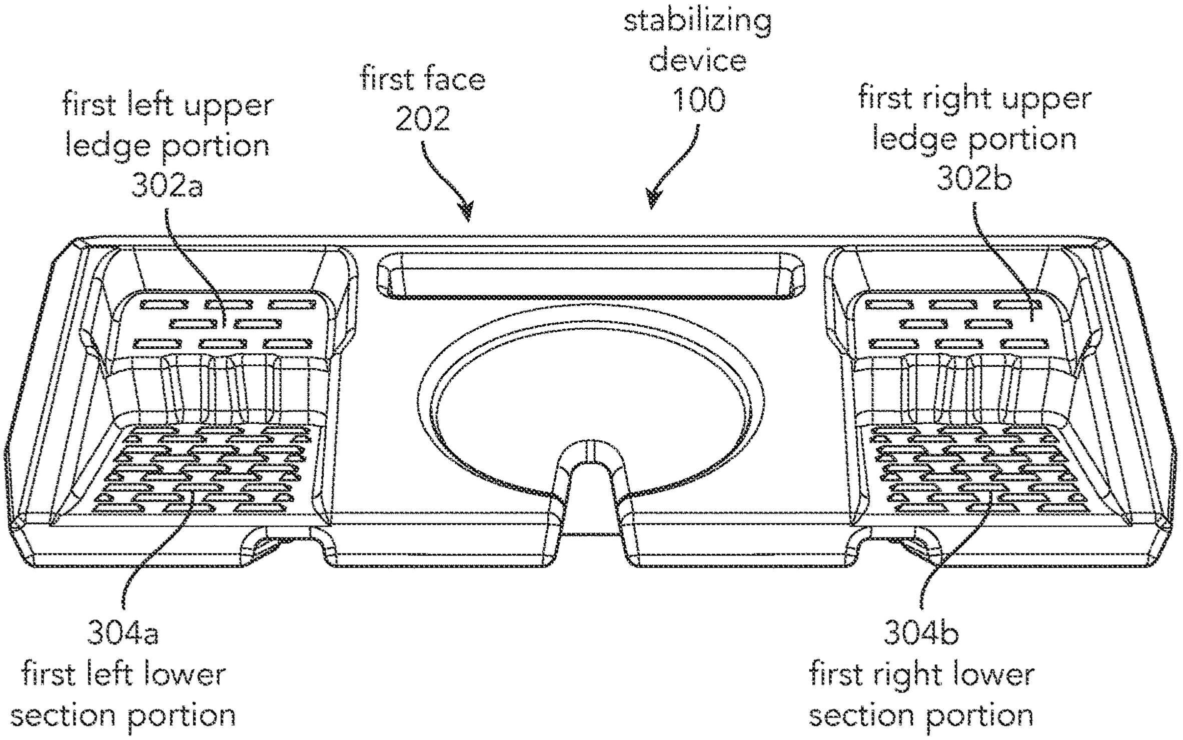
FIGS. 3A and 3B illustrate front views of a first face and a second face of the stabilizing device, respectively, according to some embodiments.

FIG. 3A illustrates a front view of the first face 202 of the stabilizing device 100. As previously discussed, in some embodiments, the first face 202 includes a first upper ledge 204 and a first lower section 208. The first upper ledge 204 may include first upper ledge portions 302, such as a first left upper ledge portion 302*a* and a first right upper ledge portion 302*b*, as shown in FIG. 3A. Similarly, the first lower section 208 may include first lower section portions 304, such as a first left lower section portion 304*a* and a first right lower section portion 304*b*, as shown in FIG. 3A. In some embodiments, the first right upper ledge portion 302*b* is spaced from the first left upper ledge portion 302*a*, and the first right lower section portion 304*b* is spaced from the first left lower section portion 304*a*.

When the first face 202 is supporting a user 10, the first left upper ledge portion 302*a* may be configured to receive the toes of the left foot of the user 10, and the first left lower section portion 304*a* may be configured to receive the heel of the left foot of the user 10. Similarly, the first right upper ledge portion 302*b* may be configured to receive the right toes of the user 10, and the first right lower section portion 304*b* may be configured to receive the right heel of the user 10.

Alternatively, if the user 10 is standing with their heels on the first upper ledge 204 and their toes on the first lower section 208, then the first left upper ledge portion 302*a* may be configured to receive the right heel of the user 10 and the first left lower section portion 304*a* may be configured to receive the right toes of the user 10. Similarly, the first right upper ledge portion 302*b* may be configured to receive the left heel of the user 10 and the first right lower section portion 304*b* may be configured to receive the left toes of the user 10.

Figure 3B:
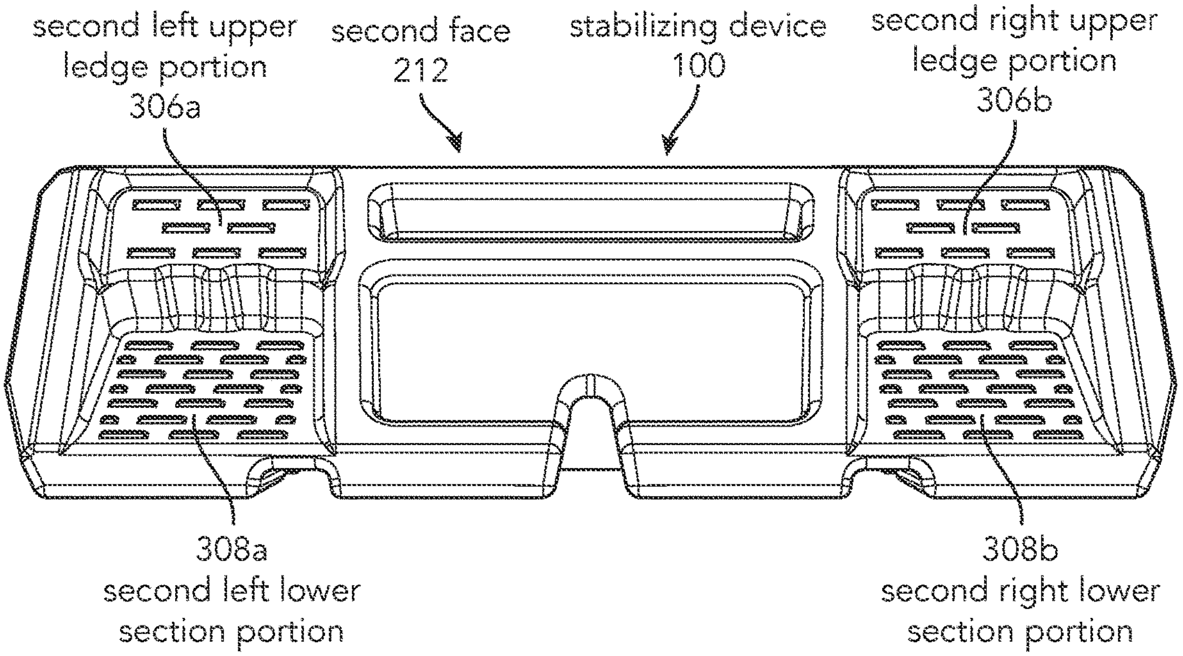

FIG. 3B illustrates a front view of the second face 212 of the stabilizing device 100. As aforementioned, in some embodiments the second face 212 includes a second upper ledge 214 and a second lower section 218. The second upper ledge 214 may include second upper ledge portions 306, such as a second left upper ledge portion 306*a* and a second right upper ledge portion 306*b*, as shown in FIG. 3B. Likewise, the second lower section 218 may include second lower section portions 308, such as a second left lower section portion 308*a* and a second right lower section portion 308*b*, as shown in FIG. 3B. According to some embodiments, the second right upper ledge portion 306*b* is spaced from the second left upper ledge portion 306*a*, and the second right lower section portion 308*b* is spaced from the second left lower section portion 308*a*.

When the second face 212 is supporting a user 10, the second left upper ledge portion 306*a* may be configured to receive the toes of the left foot of the user 10, and the second left lower section portion 308*a* may be configured to receive the heel of the left foot of the user 10. Likewise, the second right upper ledge portion 306*b* may be configured to receive the right toes of the user 10, and the second right lower section portion 308*b* may be configured to receive the right heel of the user 10.

Conversely, if the user 10 is standing with their heels on the second upper ledge 214 and their toes on the second lower section 218, then the second left upper ledge portion 306*a* may be configured to receive the right heel of the user 10 and the second left lower section portion 308*a* may be configured to receive the right toes of the user 10. Likewise, the second right upper ledge portion 306*b* may be configured to receive the left heel of the user 10 and the second right lower section portion 308*b* may be configured to receive the left toes of the user 10.

When a ladder, or similar object, such as a workbench, is placed on the first face 202 of the stabilizing device 100, the first left lower section portion 304*a* and the first right lower section portion 304*b* may be configured to receive the feet of the ladder. Likewise, when a ladder or similar object is placed on the second face 212 of the stabilizing device 100, the second left lower section portion 308*a* and the second right lower section portion 308*b* may be configured to receive the feet of the ladder.

Figure 4A:
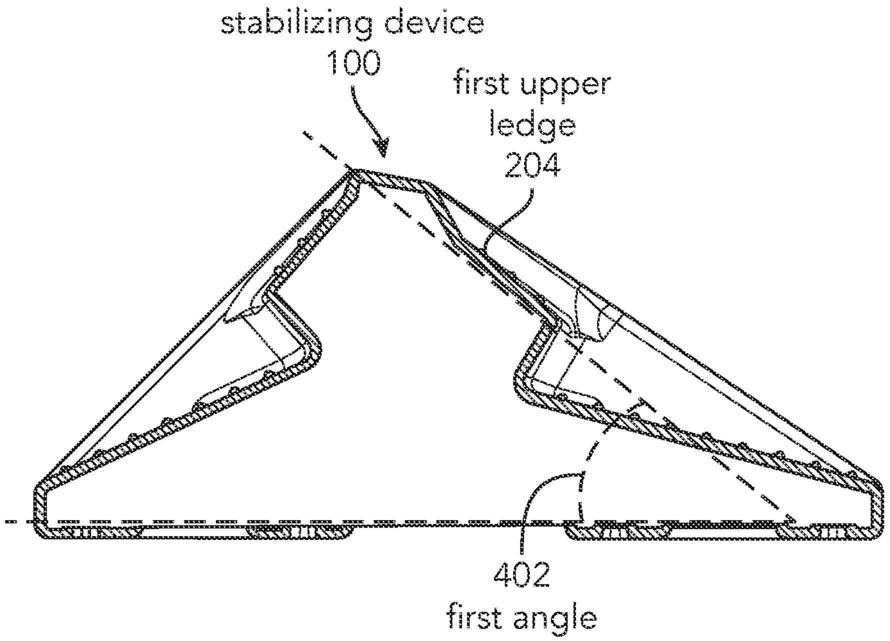
FIGS. 4A, 4B, 5A, and 5B illustrate side views of the stabilizing device, according to some embodiments.

FIG. 4A illustrates that, in some embodiments, the first upper ledge 204, including the first left upper ledge portion 302*a* and the first right upper ledge portion 302*b*, defines a first angle 402 with respect to the base 104 of the stabilizing device 100. The first angle 402 may be about 39 degrees. In some embodiments, the first angle 402 ranges from 20 degrees to 60 degrees. The first angle 402 may be about 25 degrees. In some embodiments, the first angle 402 is about 30 degrees. The first angle 402 may be about 35 degrees. In some embodiments, the first angle 402 is about 40 degrees. The first angle 402 may be about 45 degrees. In some embodiments, the first angle 402 is about 50 degrees. The first angle 402 may be about 55 degrees. The first upper ledge 204 may define a length of about 2.5 inches.

Figure 4B:
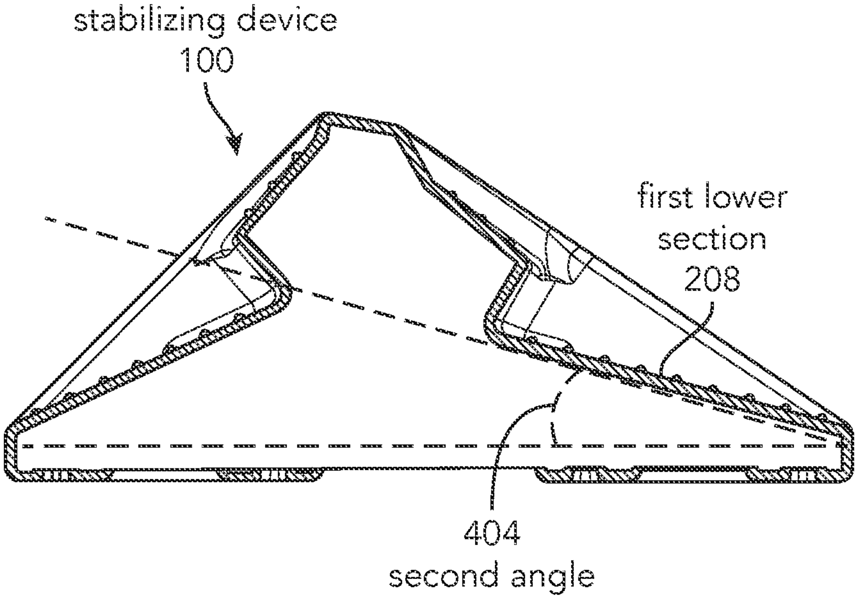

In some embodiments, as shown in FIG. 4B, the first lower section 208, including the first left lower section portion 304*a* and the first right lower section portion 304*b*, defines a second angle 404 with respect to the base 104. The second angle 404 may be about 15 degrees. In some embodiments, the second angle 404 ranges from 0 degrees to 45 degrees. The second angle 404 may be about 5 degrees. In some embodiments, the second angle 404 is about 10 degrees. The second angle 404 may be about 14 degrees. In some embodiments, the second angle 404 is about 20 degrees. The second angle 404 may be about 25 degrees. In some embodiments, the second angle 404 is about 30 degrees. The second angle 404 may be about 35 degrees.

The second angle 404 may be about 40 degrees. In some embodiments, the first lower section 208 defines a length of about 7 inches.

Figure 5A:
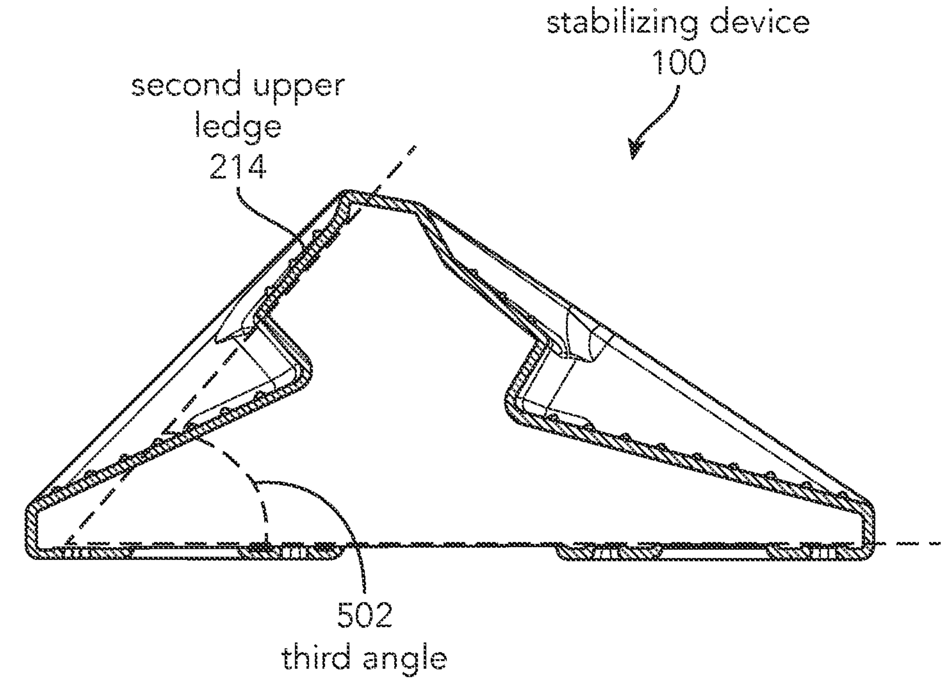

FIG. 5A illustrates that, according to some embodiments, the second upper ledge 214, including the second left upper ledge portion 306*a* and the second right upper ledge portion 306*b*, defines a third angle 502 with respect to the base 104 of the stabilizing device 100. The third angle 502 may be about 50 degrees. In some embodiments, the third angle 502 ranges from 30 degrees to 70 degrees. The third angle 502 may be about 35 degrees. In some embodiments, the third angle 502 is about 40 degrees. The third angle 502 may be about 45 degrees. In some embodiments, the third angle 502 is 52 degrees. The third angle 502 may be about 55 degrees. In some embodiments, the third angle 502 is about 60 degrees. The third angle 502 may be about 65 degrees. In some embodiments, the third angle 502 is about 70 degrees. The second upper ledge 214 may define a length of about 2.5 inches.

Figure 5B:
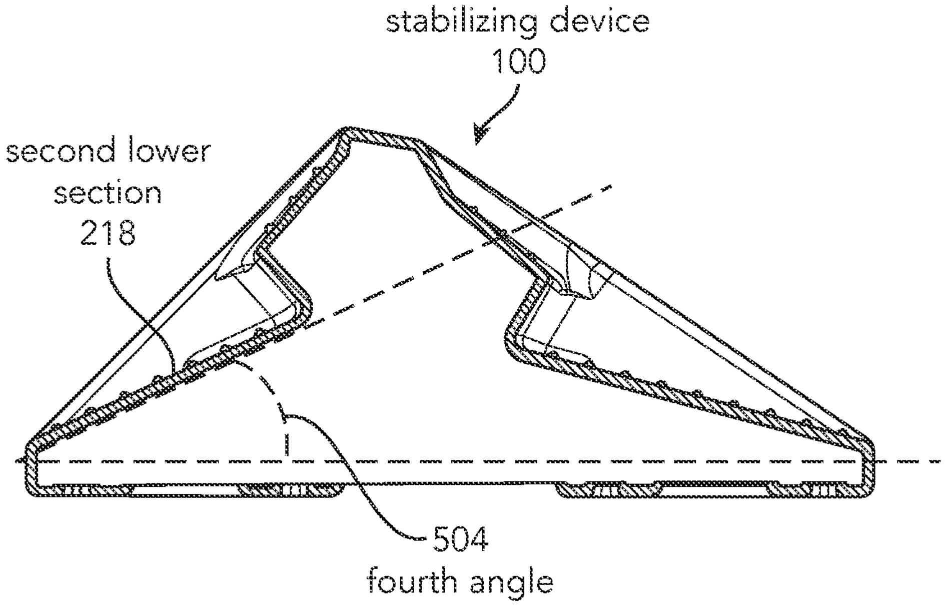

In some embodiments, as shown in FIG. 5B, the second lower section 218, including the second left lower section portion 308*a* and the second right lower section portion 308*b*, defines a fourth angle 504 with respect to the base 104. The fourth angle 504 may be about 25 degrees. In some embodiments, the fourth angle 504 ranges from 0 degrees to 45 degrees. The fourth angle 504 may be about 5 degrees. In some embodiments, the fourth angle 504 is about 10 degrees. The fourth angle 504 may be about 15 degrees. In some embodiments, the fourth angle 504 is about 20 degrees. The fourth angle 504 may be 23 degrees. In some embodiments, the fourth angle 504 is about 28 degrees. The fourth angle 504 may be about 30 degrees. In some embodiments, the fourth angle 504 is about 35 degrees. The fourth angle 504 may be about 40 degrees. In some embodiments, the second lower section 218 defines a length of about 5.75 inches.

In this disclosure, the term "about" is used to mean "approximately" and includes a tolerance of +/−10 degrees and +/−2 inches. It should also be noted that the angle measurements listed here are intended as nonlimiting examples, and any of the first angle 402, the second angle 404, the third angle 502, and the fourth angle 504 may define values not explicitly stated in this disclosure. Likewise, the example length dimensions provided here are intended as nonlimiting examples, and any of the first upper ledge 204, the first lower section 208, the second upper ledge 214, and the second lower section 218 may define dimensions not explicitly stated in this disclosure.

Figure 6:
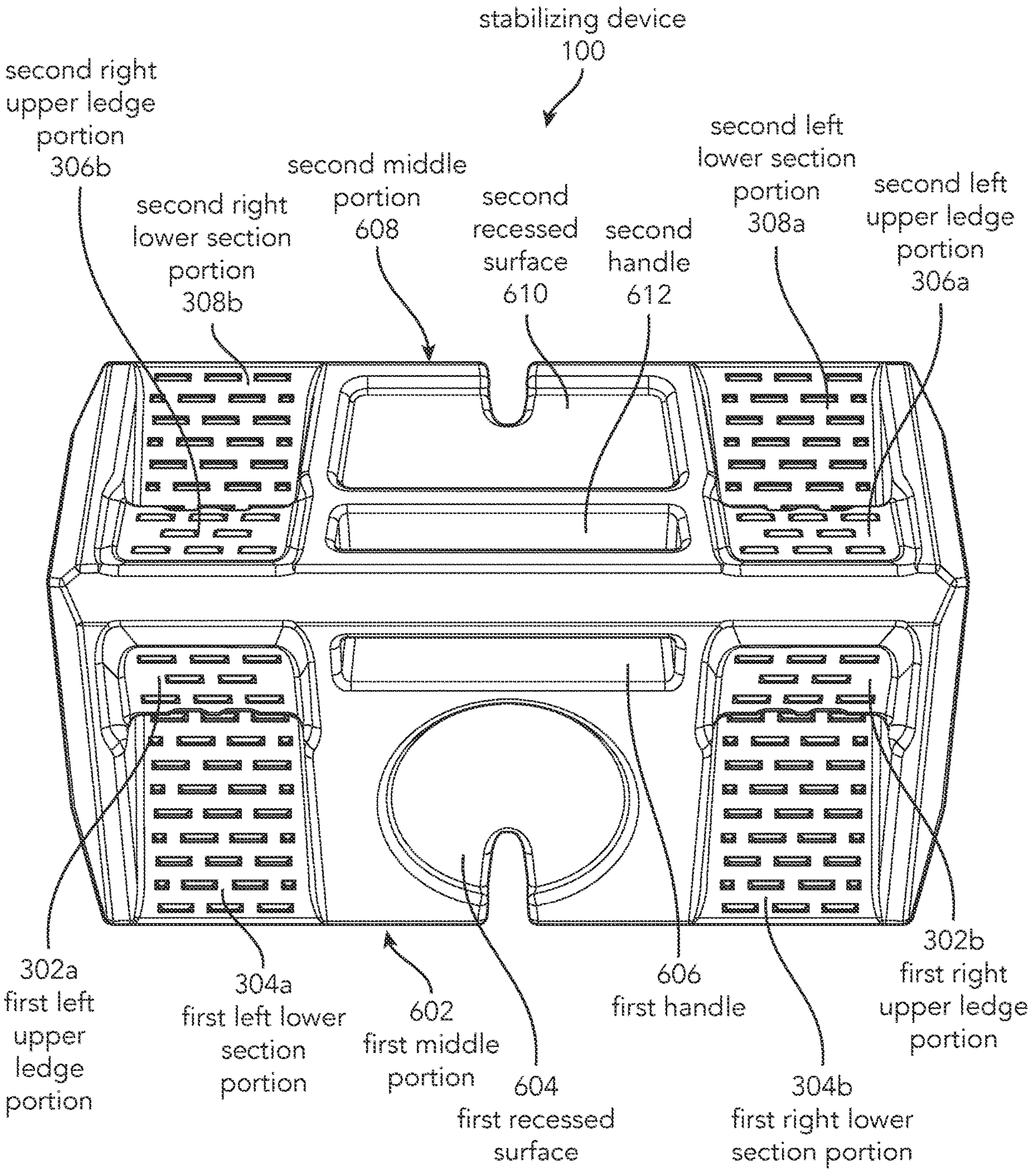
FIG. 6 illustrates a top view of the stabilizing device, according to some embodiments.

FIG. 6 shows a top view of the stabilizing device 100, and includes the first face 202 and the second face 212. In some embodiments, the stabilizing device 100 includes a first middle portion 602 located along the first face 202 and a second middle portion 608 located along the second face 212. As illustrated in FIG. 6, the first middle portion 602 may be located between the first left upper ledge portion 302*a* and the first right upper ledge portion 302*b*, as well as between the first left lower section portion 304*a* and the first right lower section portion 304*b*. Similarly, the second middle portion 608 may be located between the second left upper ledge portion 306*a* and the second right upper ledge portion 306*b*, as well as between the second left lower section portion 308*a* and the second right lower section portion 308*b*. In some embodiments, the first middle portion 602 defines an angle with respect to the base 104 of about 33.75 degrees, which corresponds to an 8/12 roof pitch, making the first face 202 appropriate for use on a roof of that pitch or lower. The second middle portion 608 may define an angle with respect to the base 104 of about 45 degrees, which may correspond to a 12/12 roof pitch, making the second face 212 appropriate for use on a roof of that pitch or lower.

In this disclosure, the term "about" is used to mean "approximately" and includes a tolerance of +/−10 degrees. It should also be noted that the angle measurements listed here are intended as nonlimiting examples, and either of the first middle portion 602 and/or the second middle portion 608 may define angles not explicitly stated in this disclosure.

In some embodiments, the stabilizing device includes a first recessed surface 604 and a second recessed surface 610, as illustrated in FIG. 6. The first recessed surface 604 may be located within the first middle portion 602, and the second recessed surface 610 may be located within the second middle portion 608. In some embodiments, as shown in FIG. 6, the first recessed surface 604 defines a substantially circular, round shape. The first recessed surface 604 may be configured to receive an object with a round bottom surface, such as a paint can, bucket, or the like. The first recessed surface 604 may be configured to receive an object with a bottom surface defining a shape other than a circle, as long as the object fits within the first recessed surface 604. The first recessed surface 604 may also be configured to receive loose tools, hardware, equipment, or the like, and act as a multi-purpose tray on the stabilizing device 100. In some embodiments, the first recessed surface 604 defines a shape other than a circular shape, such as, but not limited to, a rectangular shape, a triangular shape, an oblong oval shape, and the like. The first recessed surface 604 may define a depth of about 0.5 inches (+/−0.5 inches) and a diameter of about 6.5 inches (+/−2 inches).

In some embodiments, as shown in FIG. 6, the second recessed surface 610 defines a substantially rectangular shape. The second recessed surface 610 may be configured to receive an object with a rectangular bottom surface, such as a toolbox. The second recessed surface 610 may be configured to receive an object with a bottom surface defining a shape other than a rectangle, as long as the object fits within the second recessed surface 610. The second recessed surface 610 may also be configured to receive loose tools, hardware, equipment, or the like, and act as a multi-purpose tray on the stabilizing device 100. In some embodiments, the second recessed surface 610 defines a shape other than a rectangular shape, such as, but not limited to, a circular shape, a triangular shape, an oblong oval shape, and the like. The first recessed surface 604 and the second recessed surface 610 may define substantially the same shape. The second recessed surface 610 may define a depth of about 0.5 inches (+/−0.5 inches), a width of about 9 inches (+/−2 inches), and a height of about 4.25 inches (+/−2 inches).

In some embodiments, the first recessed surface 604 and/or the second recessed surface 610 define substantially smooth surfaces. The inclusion of smooth surfaces may allow for the application of information label(s) to the first recessed surface 604 and/or the second recessed surface 610. In some embodiments, the information label(s) include information such as brand name, brand logo, product use instructions, product care instructions, product warnings, material composition, dimensions, and the like.

In some embodiments, the first middle portion 602, including the first recessed surface 604, and/or the second middle portion 608, including the second recessed surface 610, defines a textured surface. The textured surface may include any texture or pattern including, but not limited to, a sandpaper-like texture or a texture similar to any of the first textured surface 206, the second textured surface 210, the third textured surface 216, and/or the fourth textured surface 220 (i.e., a texture including the plurality of raised portions 222). The use of a textured surface on the first middle portion 602 and/or the second middle portion 608 may provide friction between the stabilizing device 100 and any object or user 10 placed on the first middle portion 602 and/or the second middle portion 608.

In some embodiments, the first middle portion 602 and/or the second middle portion 608 do not include recessed surfaces. Stated differently, the first middle portion 602 and/or the second middle portion 608 may define substantially "flat" (though non-level, i.e., angled) surfaces. The first middle portion 602 and/or the second middle portion 608 may include smooth surfaces to allow for the application of information label(s) to the first middle portion 602 and/or the second middle portion 608. In some embodiments, the first middle portion 602 and/or the second middle portion 608 include textured surfaces defining any texture or pattern including, but not limited to, a sandpaper-like texture or a texture similar to any of the first textured surface 206, the second textured surface 210, the third textured surface 216, and/or the fourth textured surface 220 (i.e., a texture including the plurality of raised portions 222).

FIG. 6 also includes a first handle 606 and a second handle 612. In some embodiments, the stabilizing device 100 includes a first handle 606 located within the first middle portion 602 between the first left upper ledge portion 302*a* and the first right upper ledge portion 302*b*. The stabilizing device 100 may include a second handle 612 located within the second middle portion 608 between the second left upper ledge portion 306*a* and the second right upper ledge portion 306*b*. In some embodiments, the first handle 606 and the second handle 612 enable the user 10 to carry the stabilizing device 100 between locations, thereby enhancing the portability of the stabilizing device 100. The first handle 606 and the second handle 612 may define indentations in the shell 102 of sufficient depth to allow the user 10 to grab, lift, and carry the stabilizing device 100.

Figure 7:
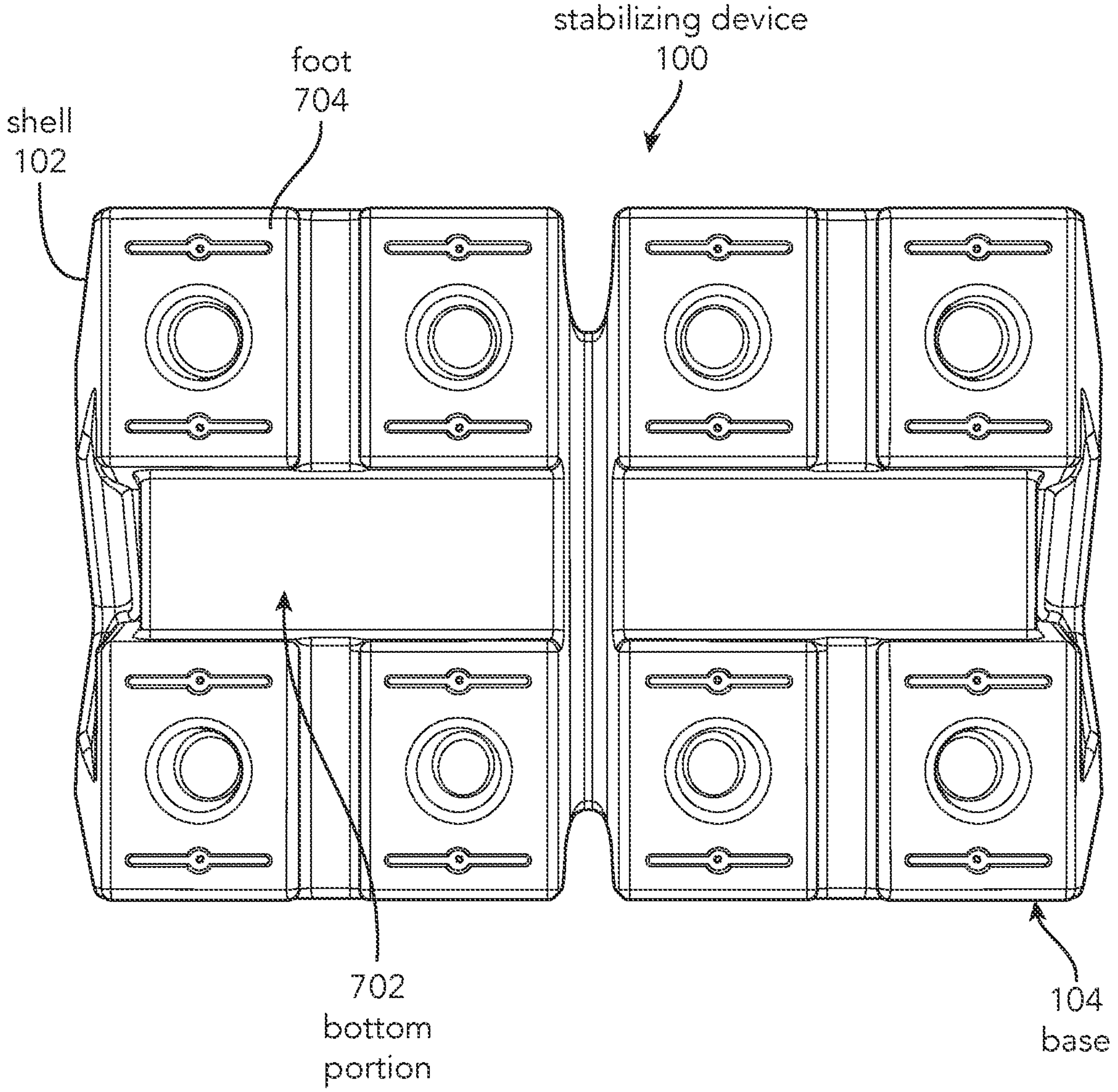
FIG. 7 illustrates a bottom view of the stabilizing device, according to some embodiments.

FIG. 7 illustrates a bottom view of the stabilizing device 100, showing the bottom portion 702 of the shell 102 and the base 104, which is configured to contact the ground surface 20. In some embodiments, the stabilizing device 100 also includes a foot 704 located along the base 104. FIG. 7 shows that the stabilizing device 100 may include multiple feet, which will be discussed in greater detail later in the disclosure. In some embodiments, the foot 704 is an integrated element of the shell 102, rather than a separate component coupled to the base 104.

Figure 8:
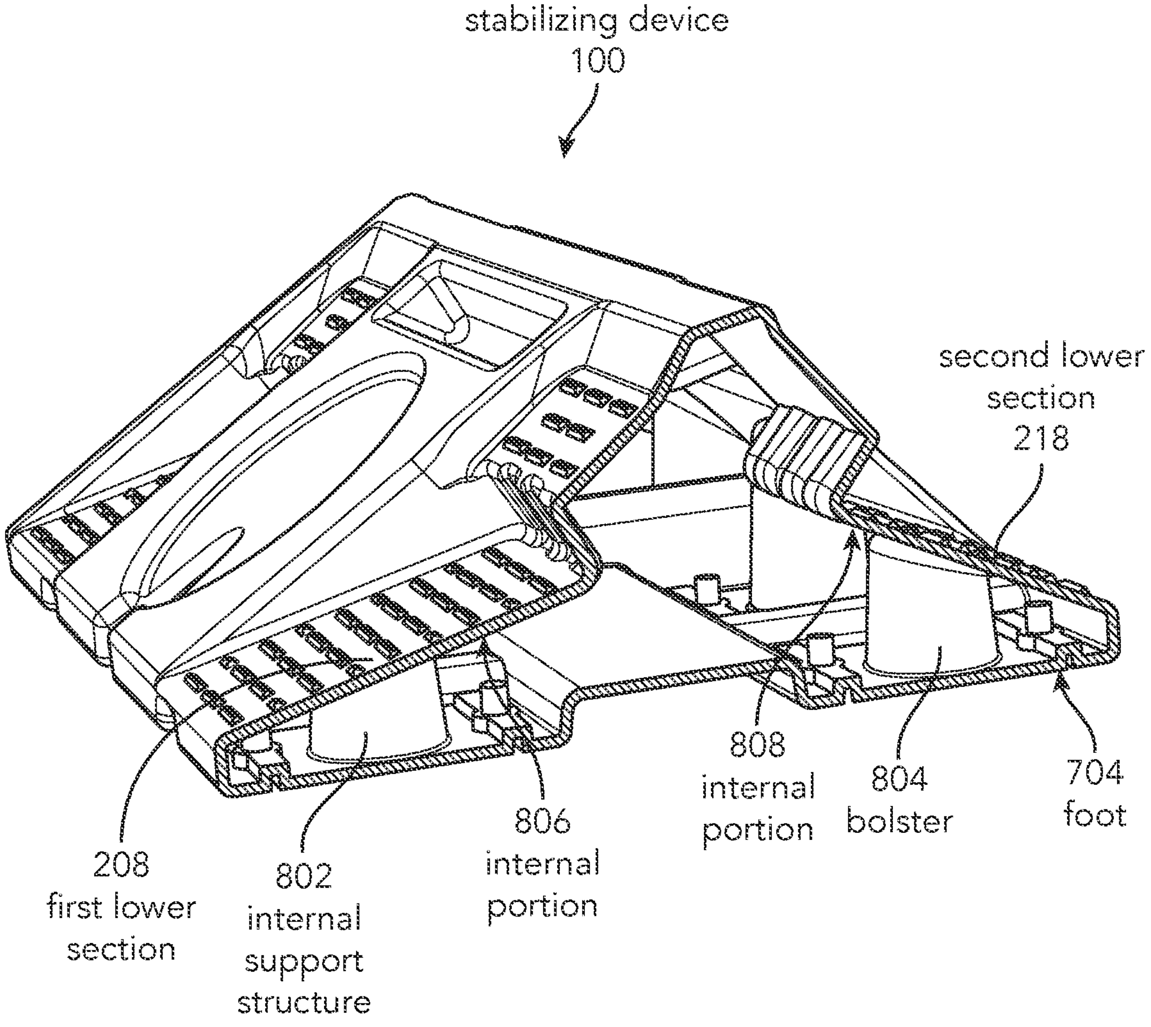
FIG. 8 illustrates an internal perspective view of the stabilizing device, according to some embodiments.

FIG. 8 shows a side perspective view of the stabilizing device 100 and includes a portion of the interior of the shell 102. In some embodiments, the stabilizing device 100 includes an internal support structure 802 located within the shell 102. The internal support structure 802 may be configured to provide structural support to the stabilizing device 100 to prevent movement (i.e., flexing, bowing, cracking, or the like) of the shell 102 when the stabilizing device 100 is in use. For example, when a ladder is placed on the first lower section 208 or the second lower section 218 of the stabilizing device 100, and a user 10 climbs on the ladder, possibly while holding additional tools or equipment, the first lower section 208 or the second lower section 218 can be subjected to a tremendous amount of force over a small area—the surface area of the feet of the ladder. Accordingly, it may be beneficial to provide additional support to these specific areas of the stabilizing device 100. In addition, the internal support structure 802 may provide additional support to the first middle portion 602 and the second middle portion 608. In some embodiments, the inclusion of the internal support structure 802 prevents the need for other internal support options, such as filling the shell 102 with reinforcing spray foam.

The internal support structure 802 may include a bolster 804, as shown in FIG. 8. In some embodiments, the internal support structure 802 includes multiple bolsters 804. Each bolster 804 may extend from each foot 704 to an internal portion 806 of the first lower section 208 or to an internal portion 808 of the second lower section 218. More specifically, each bolster 804 may extend to an internal portion of at least one of the first left lower section portion 304*a*, the first right lower section portion 304*b*, the second left lower section portion 308*a*, and the second right lower section portion 308*b* to thereby provide support to the portion(s). In some embodiments, the bolster 804 also provides support to the middle sections of the stabilizing device 100, namely the first middle portion 602 and the second middle portion 608.

Figure 9:
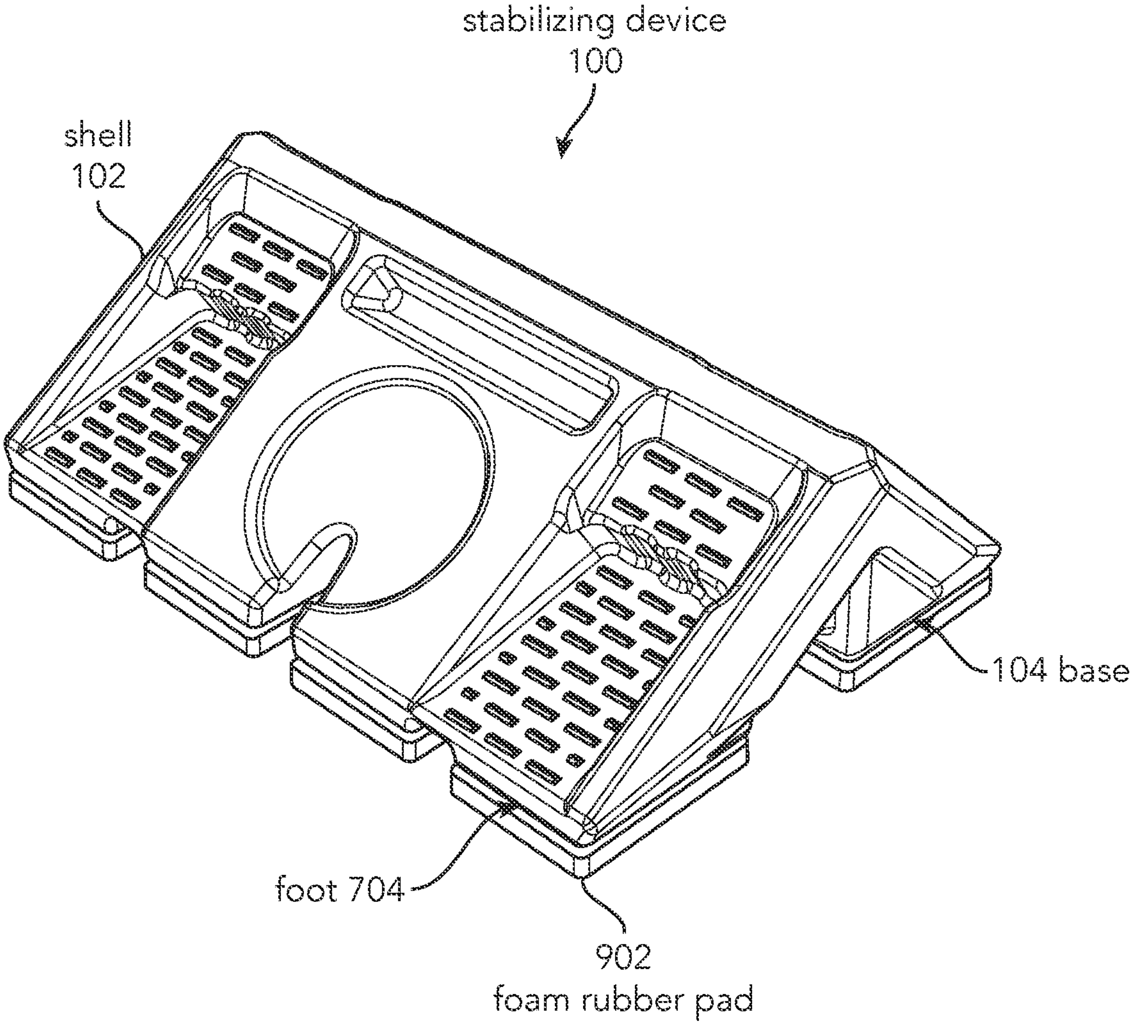
FIG. 9 illustrates a perspective view of the first face of the stabilizing device, according to some embodiments.

FIG. 9 illustrates a perspective view of the stabilizing device 100, including the shell 102 and the base 104. FIG. 9 also includes the foot 704 located along the base 104 of the shell 102. In some embodiments, the stabilizing device 100 includes a foam rubber pad 902 coupled to the foot 704. The foam rubber pad 902 may be removably coupled to the foot 704, as will be discussed in greater detail with reference to FIG. 14. When the stabilizing device 100 is placed on the ground surface 20, as shown in FIG. 1, the foam rubber pad 902 may be configured to directly contact the ground surface 20. The foam rubber pad 902 may be configured to increase traction of the stabilizing device 100 and protect working surfaces including, but not limited to, flooring, wood and composite decks, concrete, plywood, roofing underlayment, asphalt shingles, and metal roofing. The foam rubber pad 902 may be effective on any of the above-named working surfaces, even in the presence of moisture and debris.

In some embodiments, the foam rubber pad 902 is made of a partially open cell structure, which, when compressed, such as after applying downward force by an object or user 10 on the stabilizing device 100, creates a suction-like seal with the ground surface 20 and prevents the device 100 from moving. The foam rubber pad 902 may be configured to slide along the ground surface 20 when the foam rubber pad 902 is not compressed (i.e., when no downward force is applied to the stabilizing device 100). In some embodiments, the material of the foam rubber pad 902 is designed to withstand repeated attachments and detachments from working surfaces (i.e., the ground surface 20) without damaging the foam rubber pad 902.

As shown in FIG. 7, though discussed in terms of "a" foot 704, the stabilizing device 100 may include multiple feet. Likewise, though this disclosure discusses "a" foam rubber pad 902, the stabilizing device 100 may include multiple foam rubber pads 902. In some embodiments, the stabilizing device 100 includes one foam rubber pad 902 for each foot 704. The stabilizing device 100 may include any number of foam rubber pads 902, including one, two, three, four, five, six, seven, eight, or more than eight. In some embodiments, the use of multiple foam rubber pads 902, rather than a single foam rubber pad 902, helps the stabilizing device 100 accommodate uneven surfaces across all directions by providing different contact points and generally increasing the flexibility of use of the device 100.

The thickness of each foam rubber pad 902 may be about 0.5 inches. In some embodiments, the thickness of each foam rubber pad 902 is ⅝ inch. The thickness of each foam rubber pad 902 may range from 0.25 inches to 1 inch. Each foam rubber pad 902 may define different sizes. In some embodiments, example dimensions include about 8.875 inches by about 6.25 inches by about 0.5 inches and about 6.25 inches by about 4.6245 inches by about 0.5 inches. In this disclosure, the term "about" is used to mean "approximately" and includes a tolerance of +/−1 inch for the length and width dimensions. The specific dimensions stated in this disclosure are intended as nonlimiting examples. In some embodiments, each foam rubber pad 902 is durable but may be replaced after a significant amount of use and exposure to the elements, without requiring replacement of the whole stabilizing device 100.

Figure 10:
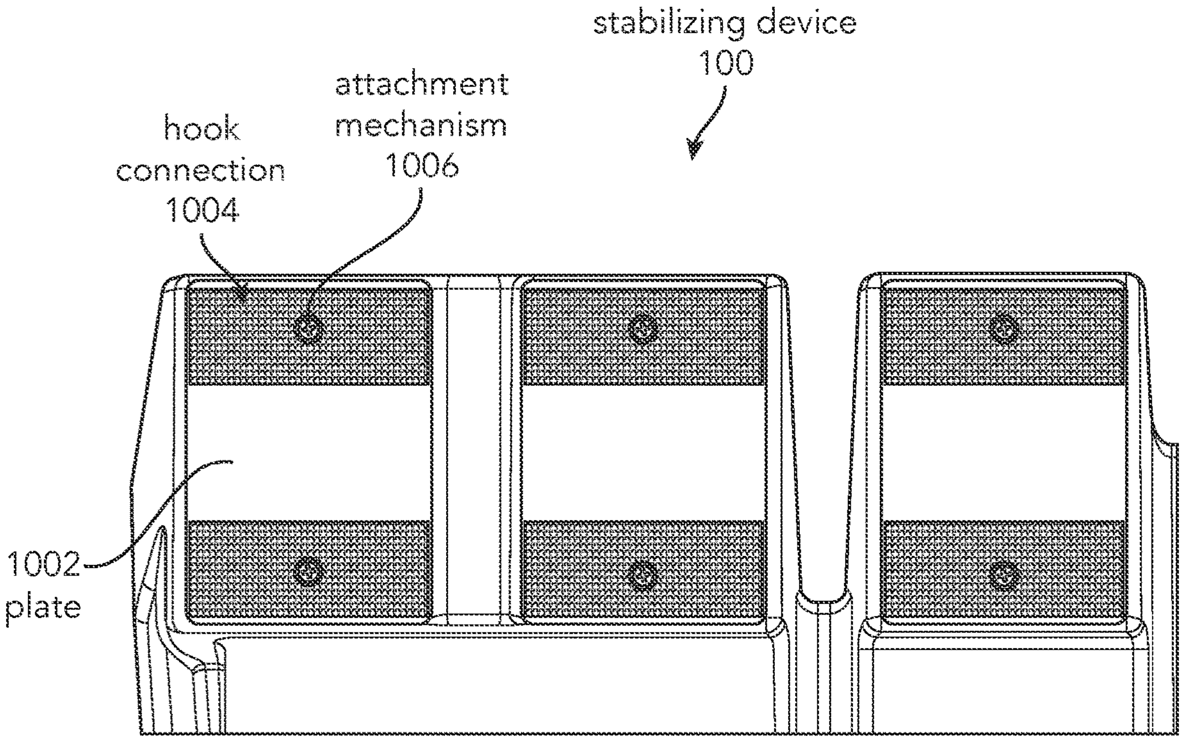
FIG. 10 illustrates a bottom view of the stabilizing device including a plate, according to some embodiments.

In some embodiments, the stabilizing device 100 includes a plate 1002, as shown in FIG. 10. The plate 1002 may be mechanically coupled to foot 704 via at least one attachment mechanism 1006, such as a screw, bolt, rivet, other threaded fastener, nail, or the like. The plate 1002 may be coupled to the foot 704 via ultrasonic staking/welding, at least one magnet, adhesive, or the like. In some embodiments, the plate 1002 includes hook connection 1004 to enable the plate 1002 to couple to the foam rubber pad 902. The hook connection 1004 may be adhesively coupled to the plate 1002. In some embodiments, the hook connection 1004 is injection molded onto the plate 1002. The plate 1002 may include two strips of hook connection 1004, as illustrated in FIG. 10. In some embodiments, the plate 1002 includes one area of hook connection 1004. Substantially an entirety of the plate 1002 may include hook connection 1004.

Figure 11:
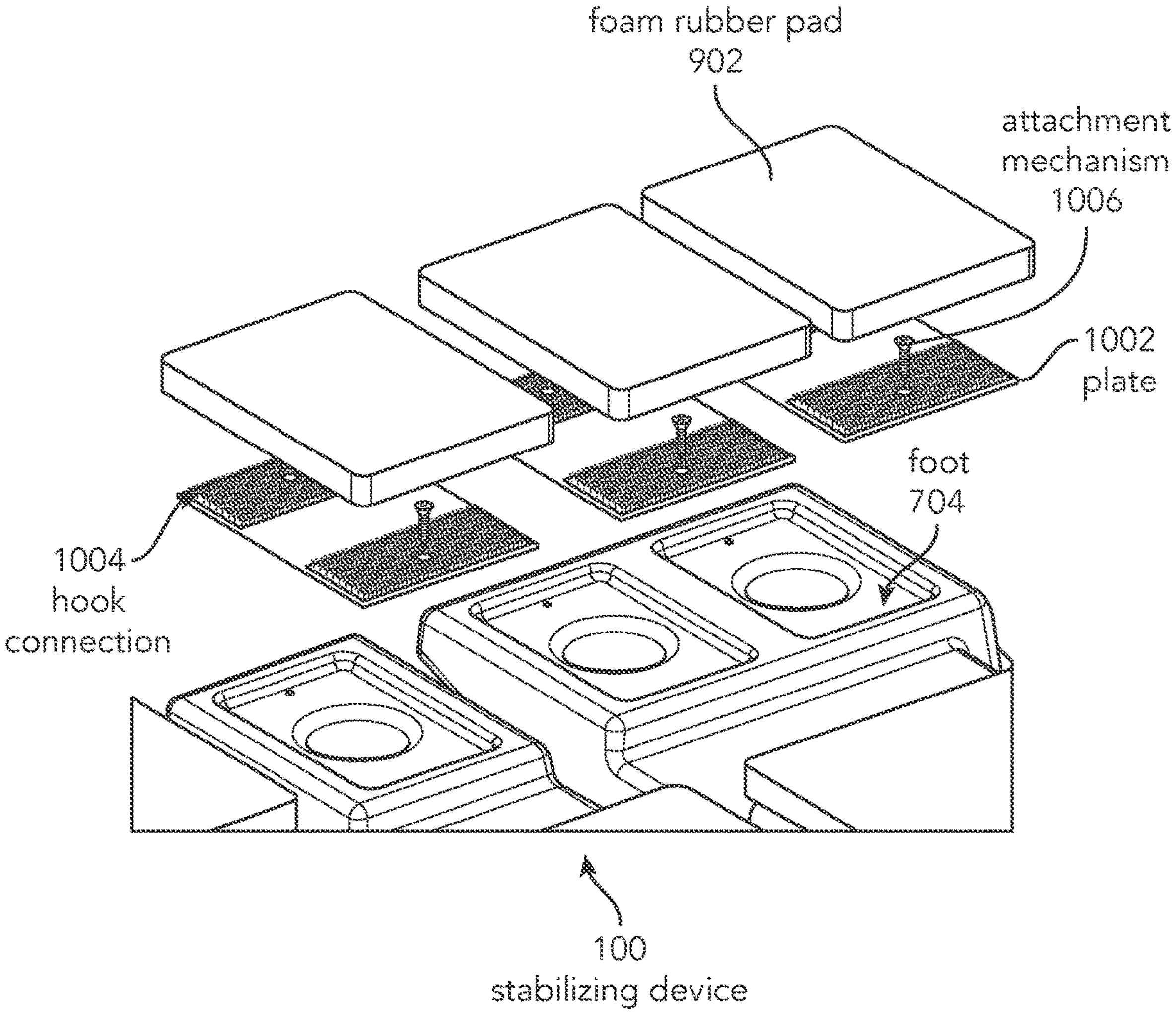
FIG. 11 illustrates an exploded view of the stabilizing device including the plate and a foam rubber pad, according to some embodiments.
Figure 14:
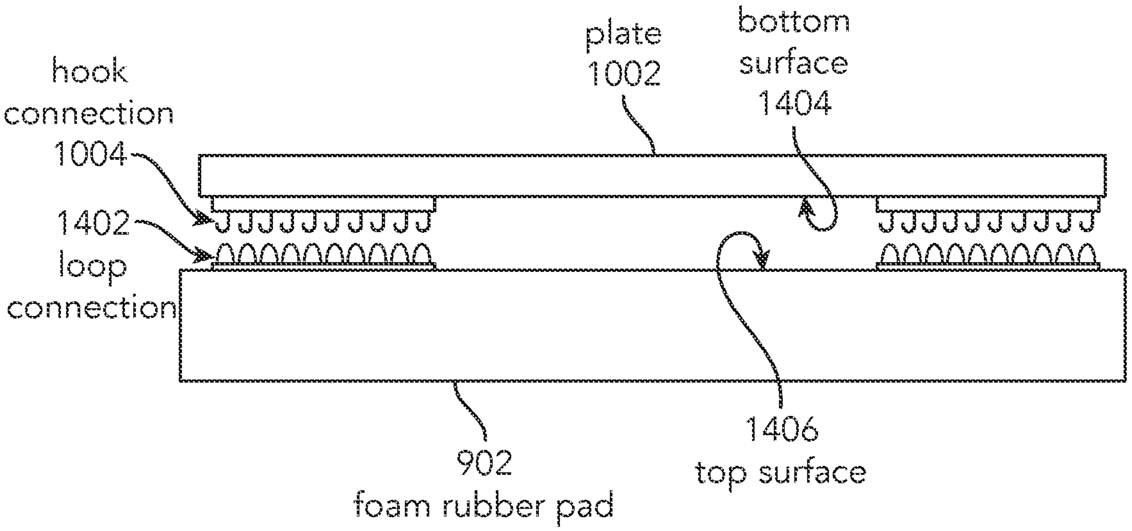
FIG. 14 illustrates a cross-section showing the connection of the foam rubber pad to the stabilizing device, according to some embodiments.

FIG. 11 shows an exploded view of the stabilizing device 100, including the foot 704, the plate 1002, and the foam rubber pad 902. In some embodiments, the foam rubber pad 902 is configured to removably couple to the plate 1002 via the hook connection 1004 of the plate 1002 and a loop connection of the foam rubber pad 902, as illustrated in FIG. 14. Accordingly, when fully assembled, the plate 1002 may be located between the foot 704 and the foam rubber pad 902. FIG. 11 also shows the attachment mechanism 1006 used to couple the plate 1002 to the foot 704. As previously discussed, the stabilizing device 100 may include multiple feet along the base 104 of the shell 102. In some embodiments, each foot 704 is configured to couple to a foam rubber pad 902 via a plate 1002. Multiple feet may be configured to couple to a single foam rubber pad 902.

Figure 12:
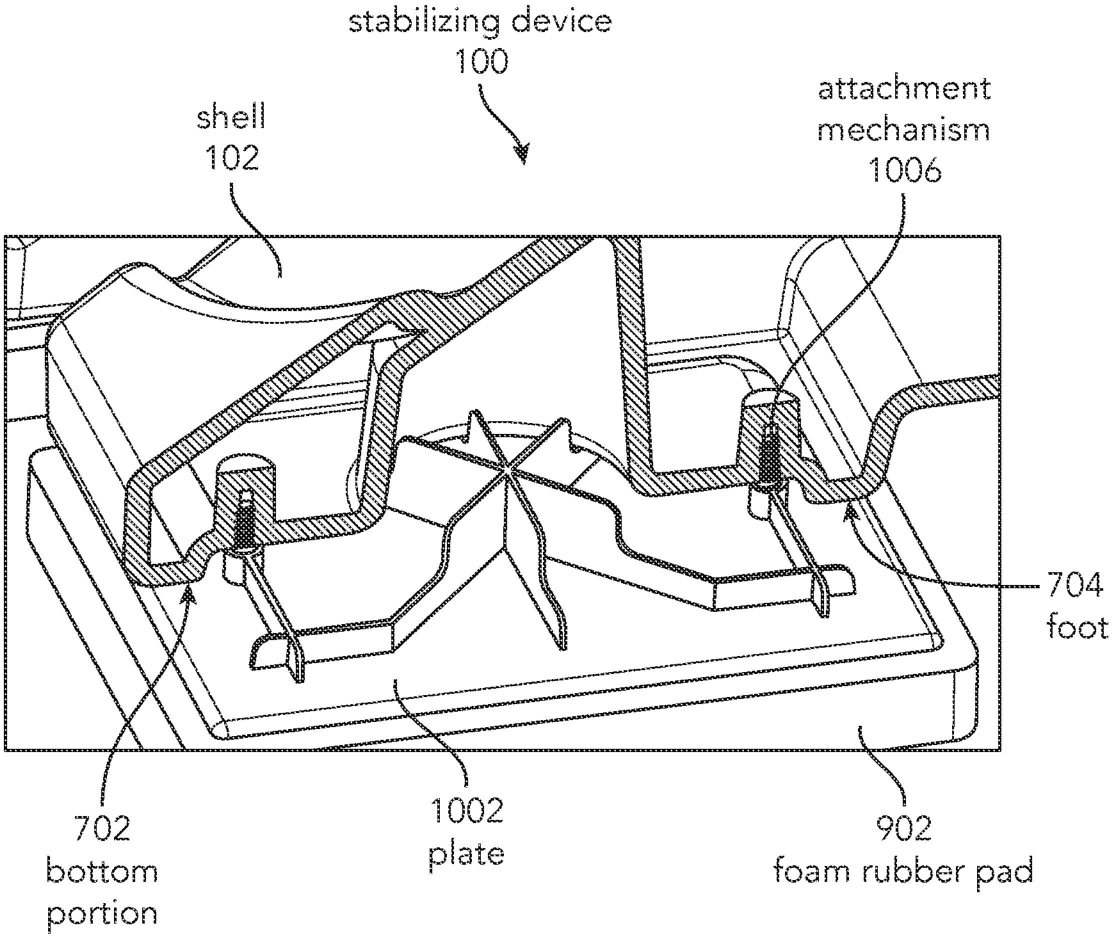
FIG. 12 illustrates an internal perspective view of the foot of the stabilizing device, according to some embodiments.
Figure 13:
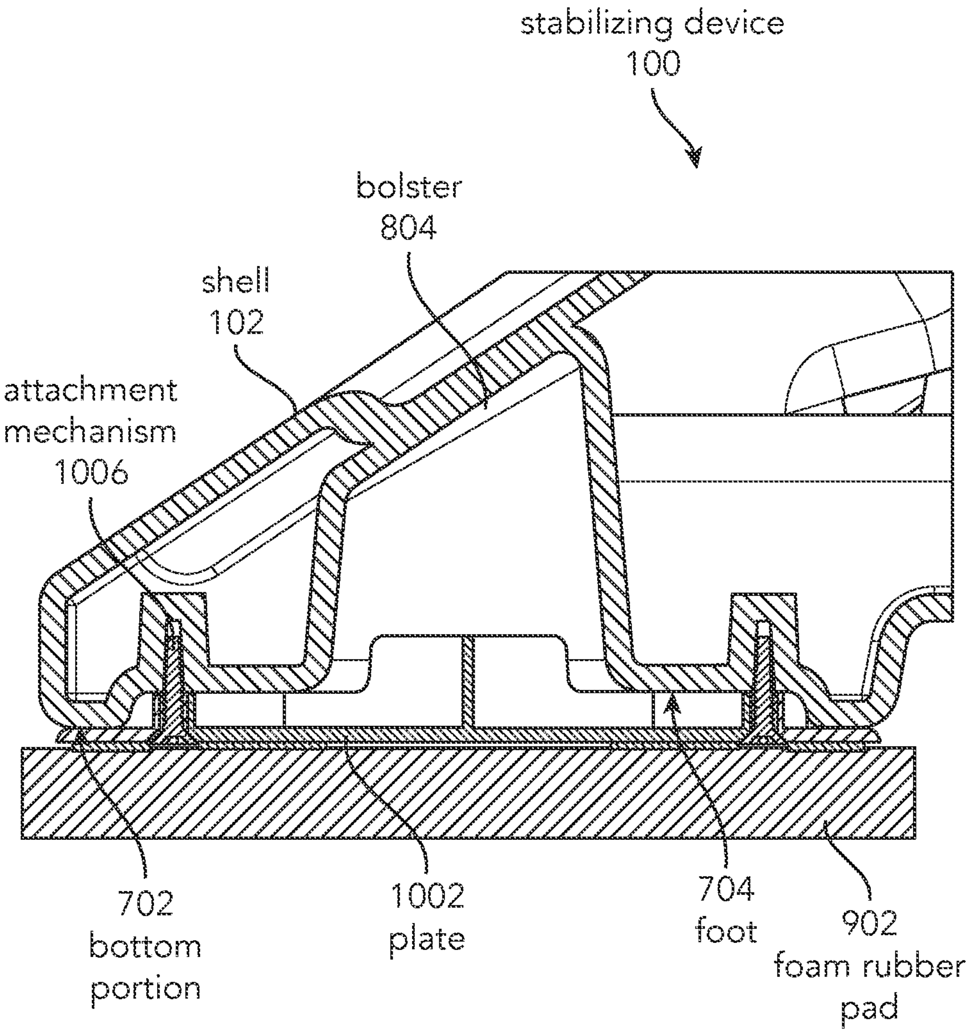
FIG. 13 illustrates a cross-section of the foot of the stabilizing device, according to some embodiments.

FIG. 12 shows a perspective view, and partial cross-section of, the bottom portion 702 of the shell 102. Similarly, FIG. 13 shows a side view cross-section of the bottom portion 702 of the shell 102. Both FIGS. 12 and 13 illustrate how the plate 1002 couples to the foot 704. As shown, the foot 704 may include areas that protrude into the interior of the shell 102 and are configured to receive the at least one attachment mechanism 1006. FIGS. 12 and 13 also show the foam rubber pad 902 coupled to the plate 1002. In some embodiments, as illustrated, the foam rubber pad 902 defines a slightly larger size, such as a greater length, than the foot 704. Making the foam rubber pad 902 slightly larger than the foot 704 may provide additional stability to the stabilizing device 100 and prevent the shell 102 from contacting a ground surface 20, thereby protecting the shell 102, and the ground surface 20, from undue damage.

The cross-sectional view of FIG. 13 also illustrates the bolster 804 and shows how the bolster 804 is incorporated into the structure of the shell 102. Stated differently, each bolster 804 may be thought of as a "built-in" element of each foot 704. As shown in FIG. 7, in some embodiments, each foot 704 includes a circular element located substantially in the center of each foot 704. As illustrated in FIGS. 12 and 13, this circular element may define the "bottom" of each bolster 804. In some embodiments, the bolster 804 defines a hollow cylinder with a tapered "top" surface where the bolster 804 contacts the interior portion of the shell 102, such as the internal portion 806 of the first lower section 208 or the internal portion 808 of the second lower section 218.

FIG. 14 shows a cross-section of the plate 1002 and the foam rubber pad 902. As previously discussed, the foam rubber pad 902 may be configured to removably couple to the plate 1002 via a hook and loop connection, represented by the hook connection 1004 and the loop connection 1402 illustrated in FIG. 14. In some embodiments, the hook connection 1004 is integrated into a bottom surface 1404 of the plate 1002, for example, via injection molding. The hook connection 1004 may be coupled to the plate 1002 via another method, such as adhesive or a similar bonding process. In some embodiments, the loop connection 1402 is adhesively coupled to a top surface 1406 of the foam rubber pad 902. The loop connection 1402 may be bonded to the foam rubber pad 902 via a number of suitable methods, including lamination.

As demonstrated in FIG. 14, the plate 1002 may include two areas of hook connection 1004 and the foam rubber pad 902 may include two corresponding areas of loop connection 1402. It should be noted that the hook connection 1004 and the loop connection 1402 do not have to perfectly align with one another, as long as there is sufficient overlap for a secure connection between the top surface 1406 of the foam rubber pad 902 and the bottom surface 1404 of the plate 1002. For example, the plate 1002 may include the two areas of hook connection 1004 shown in FIG. 14, while the foam rubber pad 902 includes a greater surface area of loop connection 1402 such as, for example, substantially the entire top surface 1406 of the foam rubber pad 902. Conversely, the foam rubber pad 902 may include the two areas of loop connection 1402 shown in FIG. 14, while substantially the entire bottom surface 1404 of the plate 1002 includes the hook connection 1004. In some embodiments, the areas of hook connection 1004 and loop connection 1402 do correspond with one another in a location other than what is shown in FIG. 14. For example, the plate 1002 may include one area of hook connection 1004, rather than two, and the foam rubber pad 902 may include one corresponding area of loop connection 1402, rather than two. In some embodiments, the hook connection 1004 is located substantially centrally on the bottom surface 1404 of the plate 1002, and the loop connection 1402 is located substantially centrally on the top surface 1406 of the foam rubber pad 902.

Coupling the foam rubber pad 902 to the plate 1002 via the hook connection 1004 and the loop connection 1402 may enable the user 10 to easily remove, reposition, and/or replace the foam rubber pad 902. For example, when the foam rubber pad 902 is coupled to the plate 1002, it may be installed crooked or off-center. The use of the hook connection 1004 and the loop connection 1402 may make it easy for the user 10 to simply remove the foam rubber pad 902 from the plate 1002, reposition it, and re-couple it to the plate 1002. In some embodiments, the foam rubber pad 902 degrades over time and requires replacement. Again, the use of the hook connection 1004 and the loop connection 1402 may make it easy for the user 10 to remove the worn-out foam rubber pad 902 and replace it with a new foam rubber pad 902. The use of a removable coupling method, like the hook connection 1004 and the loop connection 1402, may extend the life of the stabilizing device 100 by enabling replacement of only certain parts prone to wear, like the foam rubber pad 902, rather than the entire device 100. In addition to the foam rubber pad 902, the plate 1002 and/or the at least one attachment mechanism 1006 may be replaceable if needed, for example, due to damage.

Figure 15:
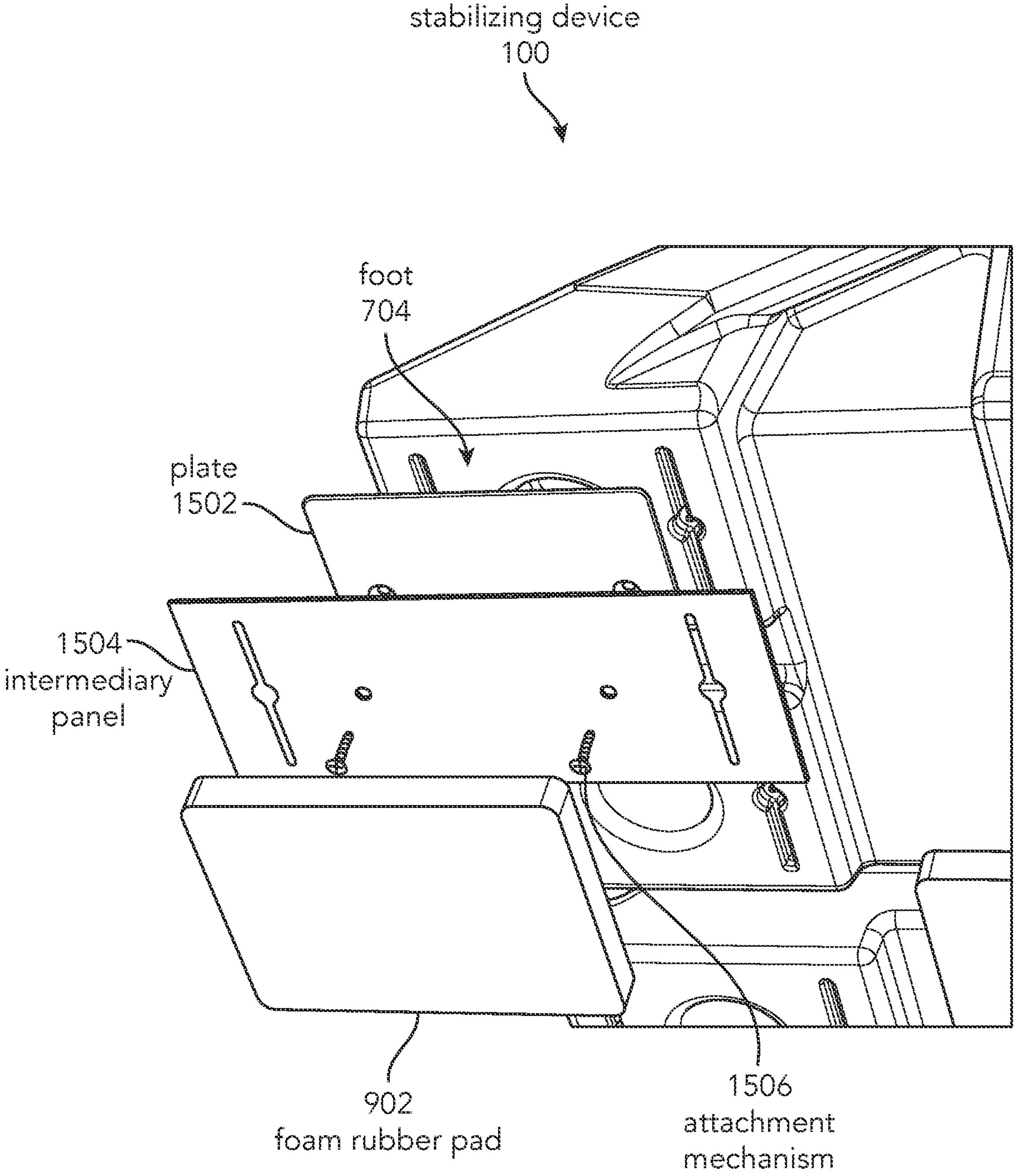
FIG. 15 illustrates an exploded bottom view of the stabilizing device including a plate, an intermediary panel, and the foam rubber pad, according to some embodiments.

In some embodiments, the stabilizing device 100 includes a slightly different method of coupling each foam rubber pad 902 to each foot 704. As shown in FIG. 15, some embodiments include a plate 1502, rather than the plate 1002 shown in FIGS. 10-14. The plate 1502 may be mechanically coupled to the foot 704 such that, when assembled, the plate 1502 is located between the foam rubber pad 902 and the foot 704. The plate 1502 may be coupled to the foot 704 via at least one attachment mechanism 1506, which may be similar to the at least one attachment mechanism 1006 used to couple the plate 1002 to the foot 704. In some embodiments, the attachment mechanism 1506 includes a mechanism such as a screw, bolt, rivet, other threaded fastener, nail, or the like. The plate 1502 may be coupled to the foot 704 via ultrasonic staking/welding, at least one magnet, adhesive, or the like.

FIG. 15 also shows an intermediary panel 1504 located between the plate 1502 and the foam rubber pad 902. In some embodiments, the intermediary panel 1504 is coupled to the plate 1502 and is configured to removably couple to the foam rubber pad 902 to thereby removably couple the foam rubber pad 902 to the plate 1502. The foam rubber pad 902 may be configured to couple to the intermediary panel 1504 via a hook-and-loop mechanism, similar to that shown in FIG. 14. In some embodiments, the intermediary panel 1504 is adhesively coupled to the foam rubber pad 902. The intermediary panel 1504 may be adhesively coupled to the plate 1502. In some embodiments, the intermediary panel 1504 is adhesively coupled to the hook material of the hook-and-loop mechanism, and the foam rubber pad 902 includes the loop material to enable coupling between the intermediary panel 1504 and the foam rubber pad 902. The use of a hook-and-loop mechanism may enable the foam rubber pad 902 to removably couple to the intermediary panel 1504 so that the foam rubber pad 902 can be removed and/or replaced, as discussed above. In some embodiments, the plate 1502 and/or the intermediary panel 1504 are also removable and replaceable.

Figure 16A:
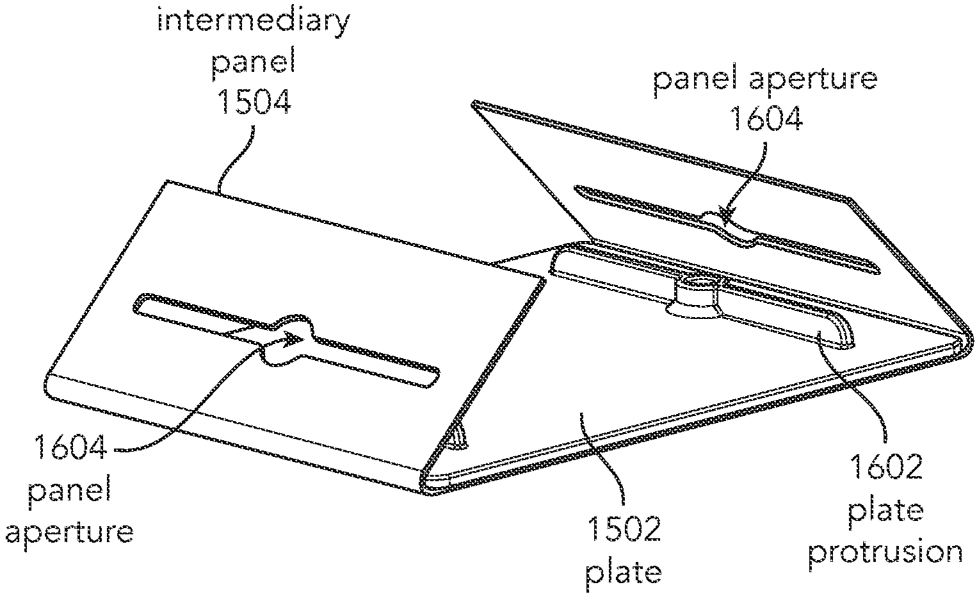
FIGS. 16A and 16B illustrate the plate and intermediary panel, according to some embodiments.
Figure 16B:
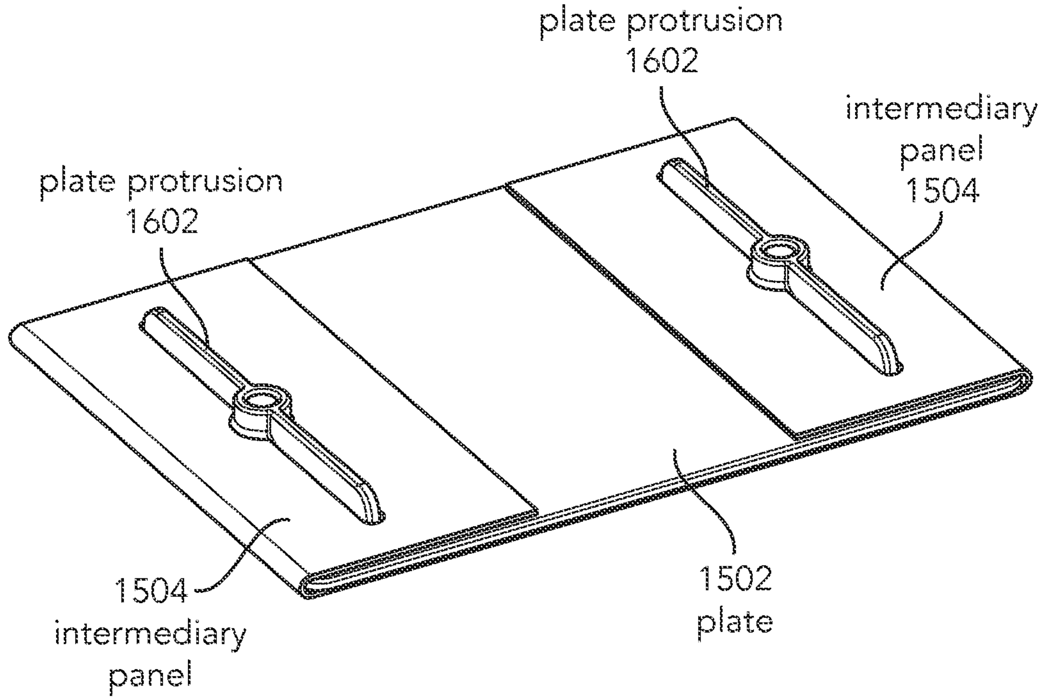

When coupled, the intermediary panel 1504 may be configured to wrap at least partially around the plate 1502, as illustrated in FIGS. 16A and 16B. In some embodiments, as shown, the plate 1502 includes a plate protrusion 1602 and the intermediary panel 1504 includes a panel aperture 1604. The panel aperture 1604 may be configured to receive the plate protrusion 1602 when the intermediary panel 1504 wraps around the plate 1502, as demonstrated in FIG. 16B. In some embodiments, the foot 704 includes a recessed area configured to receive the plate protrusion 1602 when the plate 1502 is coupled to the foot 704. Accordingly, when the plate 1502 is coupled to the foot 704, a portion of the intermediary panel 1504 (i.e., the portion that wraps around the plate 1502) may be configured to contact the foot 704. The plate protrusion 1602 may be configured to receive the attachment mechanism 1506, shown in FIG. 15, such that the attachment mechanism 1506 extends through the intermediary panel 1504, through the plate protrusion 1602, and into the foot 704. In some embodiments, the plate 1502 includes two plate protrusions 1602 and the intermediary panel 1504 includes two panel apertures 1604.

Figure 17:
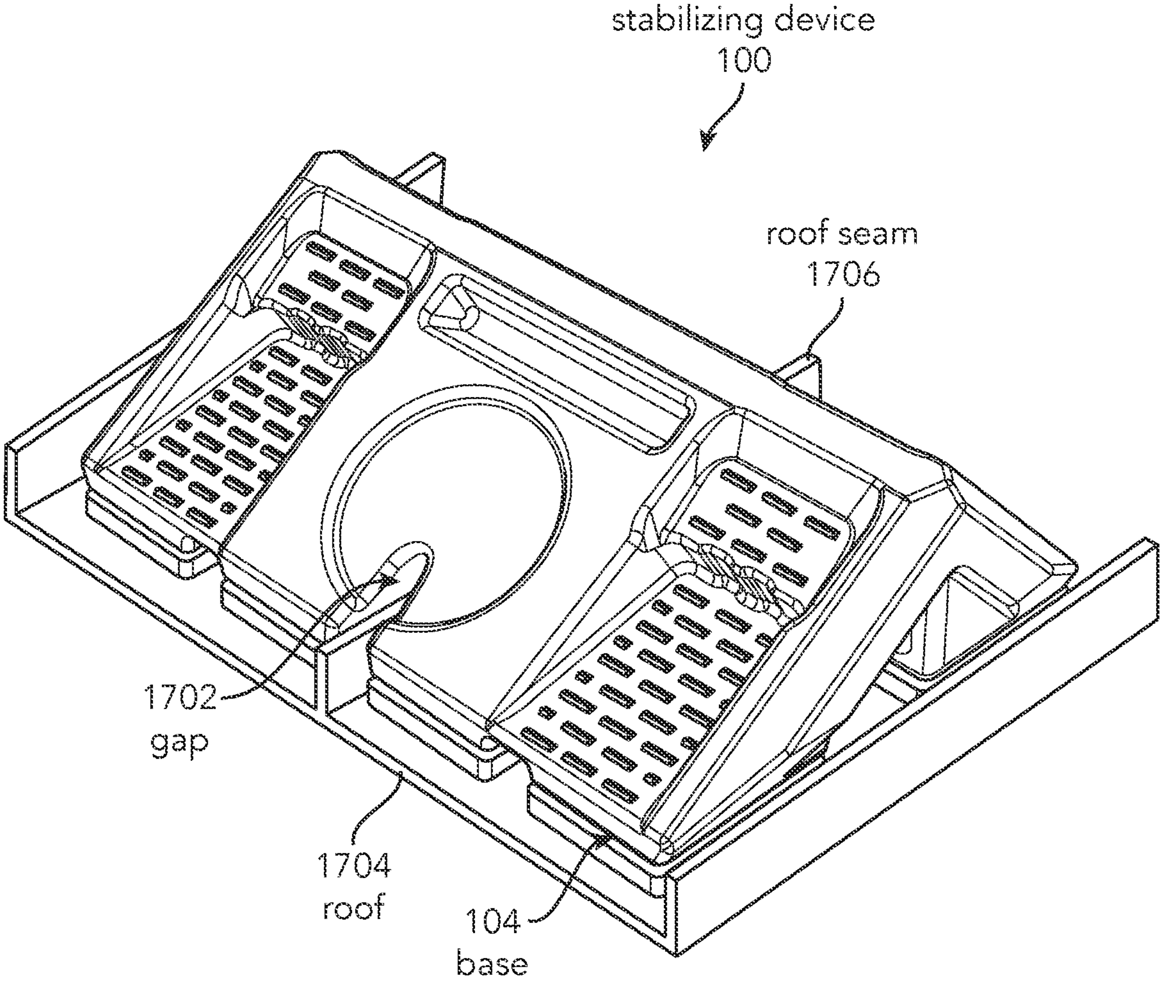
FIG. 17 illustrates a perspective view of the stabilizing device on a roof, according to some embodiments.

FIG. 17 illustrates a perspective view of the stabilizing device 100 located on a roof 1704. In some embodiments, the stabilizing device 100 includes a gap 1702 located along the base 104. The gap 1702 may be configured to extend from the first face 202 to the second face 212. In some embodiments, the gap 1702 is configured to receive a roof seam 1706, as demonstrated in FIG. 17. The roof seam 1706 may include any type of roof seam, including a standing seam of a metal roof. In some embodiments, the roof 1704 shown in FIG. 17 is a 12-inch standing seam metal roof, wherein the roof seams 1706 are spaced 12 inches apart from one another. The spacing of the roof seams 1706 and the size of the stabilizing device 100 may enable the stabilizing device 100 to be placed such that the roof seams 1706 are located on either end of the device 100 and in a center gap 1702, as shown.

Figure 18:
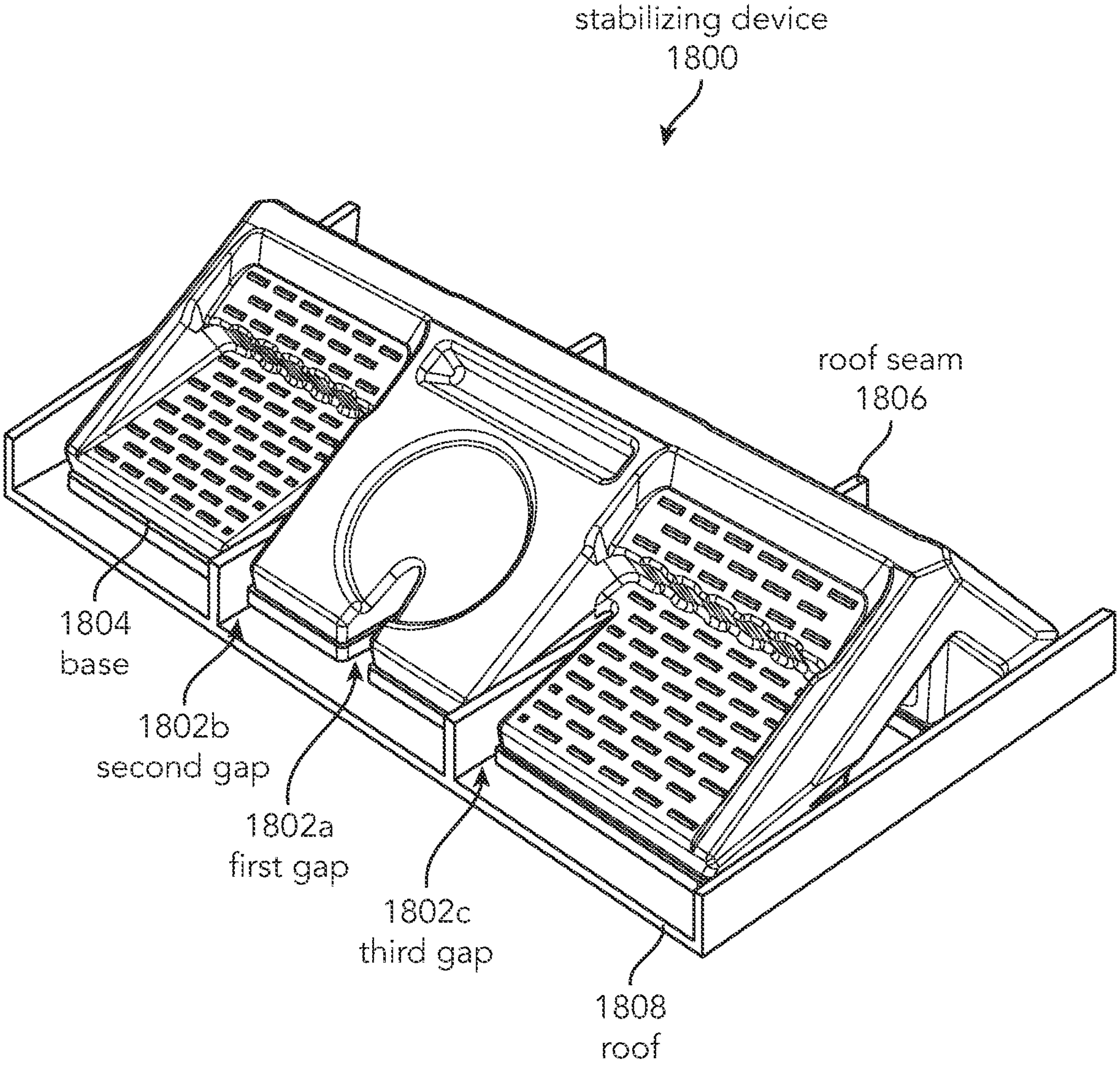
FIG. 18 illustrates a front view of a stabilizing device on a roof, according to some embodiments.

FIG. 18 illustrates a stabilizing device 1800. In some embodiments, the stabilizing device 1800 is similar to the stabilizing device 100, but defines a greater width than the stabilizing device 100, as will be discussed in greater detail with reference to FIGS. 23A, 23B, 24A, and 24B. Similar to FIG. 17, FIG. 18 shows the stabilizing device 1800 resting on a roof 1808.

In some embodiments, the stabilizing device 1800 includes three gaps 1802 located along the base 1804—a first gap 1802*a*, a second gap 1802*b*, and a third gap 1802*c*, as illustrated in FIG. 18. Like the gap 1702 of the stabilizing device 100, the gaps 1802 of the stabilizing device 1800 may be configured to receive a roof seam 1806. In some embodiments, each of the first gap 1802*a*, the second gap 1802*b*, and the third gap 1802*c* is configured to receive a roof seam 1806, depending on the distance between the seams. For example, both the roof 1704 shown in FIG. 17 and the roof 1808 shown in FIG. 18 include roof seams 1706, 1806 spaced 12 inches from one another. Another common type of standing seam metal roof includes roof seams spaced 16 inches from one another.

Accordingly, different gaps 1802 of the stabilizing device 1800 may be used for different roof styles. For example, FIG. 18 shows the stabilizing device 1800 arranged such that the roof seams 1806 are located on either end of the device 1800, in the second gap 1802*b*, and in the third gap 1802*c*, but not in the first gap 1802*a*. If the stabilizing device 1800 were placed on a roof with seams spaced 16 inches apart, the roof seams 1806 would be located on either end of the device 1800 and in the first gap 1802*a*, but not in the second gap 1802*b* or the third gap 1802*c*. It should be noted that though FIG. 18 shows the stabilizing device 1800 with three gaps 1802, the stabilizing device 1800 may include fewer than three gaps 1802. In some embodiments, the stabilizing device 1800 includes more than three gaps 1802. The width of each gap 1802, as well as the gap 1702 of the stabilizing device 100, may be about 2 inches. In this disclosure, the term “about” is used to mean “approximately” and includes a tolerance of +/−1 inch.

Figure 19:
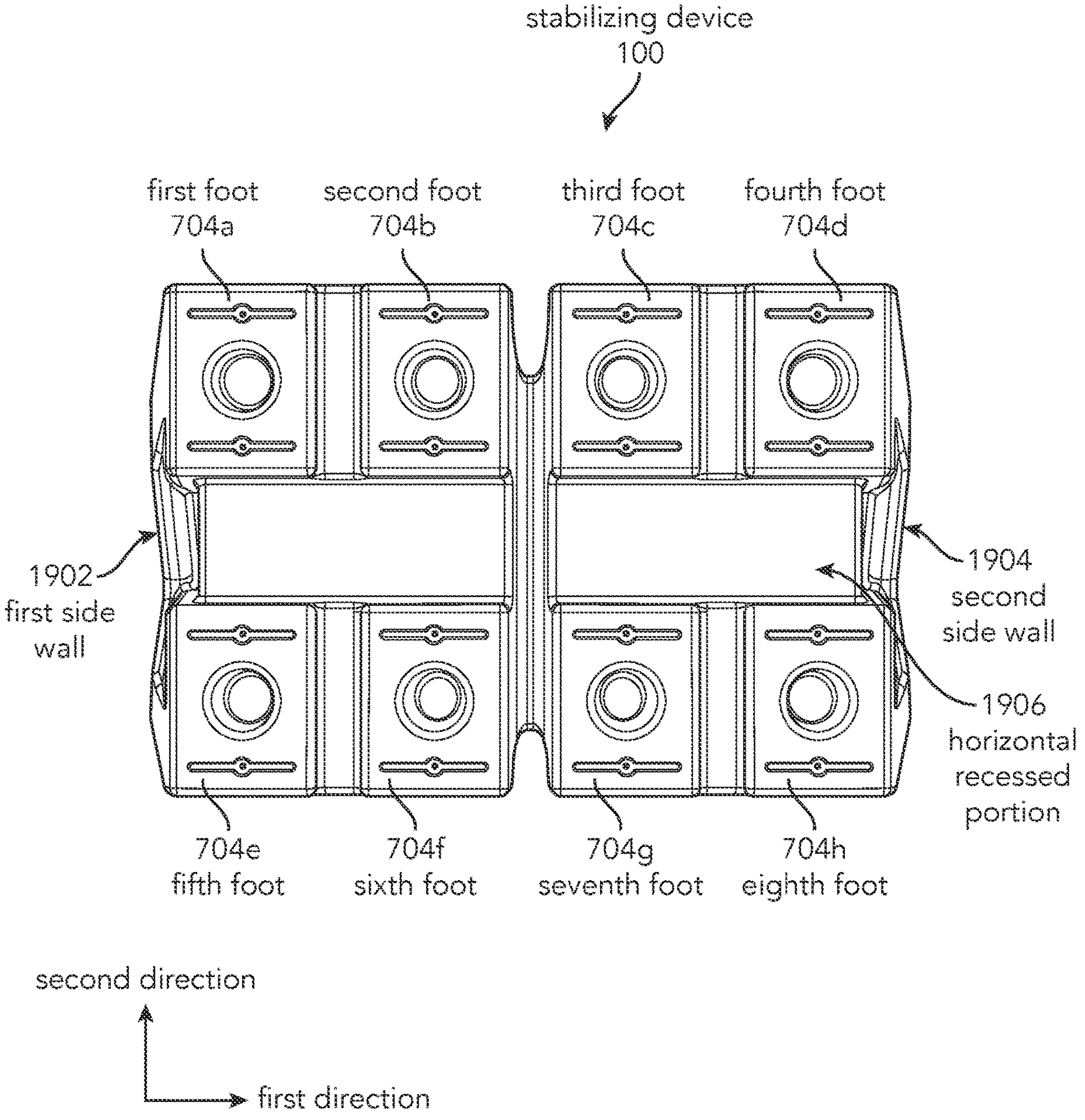
FIG. 19 illustrates a bottom view of the stabilizing device, according to some embodiments.

FIG. 19 shows a bottom view of the stabilizing device 100. As previously discussed, the stabilizing device 100 includes a foot 704. In some embodiments, as illustrated in FIG. 19, the stabilizing device 100 includes a first foot 704*a*, a second foot 704*b*, a third foot 704*c*, a fourth foot 704*d*, a fifth foot 704*e*, a sixth foot 704*f*, a seventh foot 704*g*, and an eighth foot 704*h*. The stabilizing device 100 may include fewer than eight feet. In some embodiments, the stabilizing device 100 includes more than eight feet. As previously discussed, a single foam rubber pad 902 may be configured to couple to two feet, such as the first foot 704*a* and the second foot 704*b*, or the third foot 704*c* and the fourth foot 704*d*. In some embodiments, a single foam rubber pad 902 is configured to couple to the first foot 704*a* and the fifth foot 704*e*, another foam rubber pad 902 is configured to couple to the second foot 704*b* and the sixth foot 704*f*, and so on.

According to some embodiments, the size of the foam rubber pad 902 is variable as compared to the size of the at least one foot 704, which is the same for each of the first-eighth foot 704*a-h*. According to some embodiments, the size of the foam rubber pad 902 is about double the size of each foot 704, meaning one foam rubber pad 902 is configured to respectively couple to two of the at least one foot 704. In some embodiments, the size of the foam rubber pad 902 is directly proportional to the size of each 704. According to some embodiments, the size of the foam rubber pad 902 is proportional but slightly larger in area than each foot 704.

FIG. 19 also includes a directional indicator showing a first direction and a second direction. As indicated, in some embodiments, the second foot 704*b* is spaced from the first foot 704*a* along the first direction. Similarly, the third foot 704*c* may be spaced from the second foot 704*b* along the first direction, and the fourth foot 704*d* may be spaced from the third foot 704*c* along the first direction. In some embodiments, the fifth foot 704*e* is spaced from the first foot 704*a* along the second direction. The sixth foot 704*f* may be spaced from the fifth foot 704*e* along the first direction and from the second foot 704*b* along the second direction. Similarly, the seventh foot 704*g* may be spaced from the sixth foot 704*f* along the first direction and from the third foot 704*c* along the second direction. Likewise, the eighth foot 704*h* may be spaced from the seventh foot 704*g* along the first direction and from the fourth foot 704*d* along the second direction.

Figure 20A:
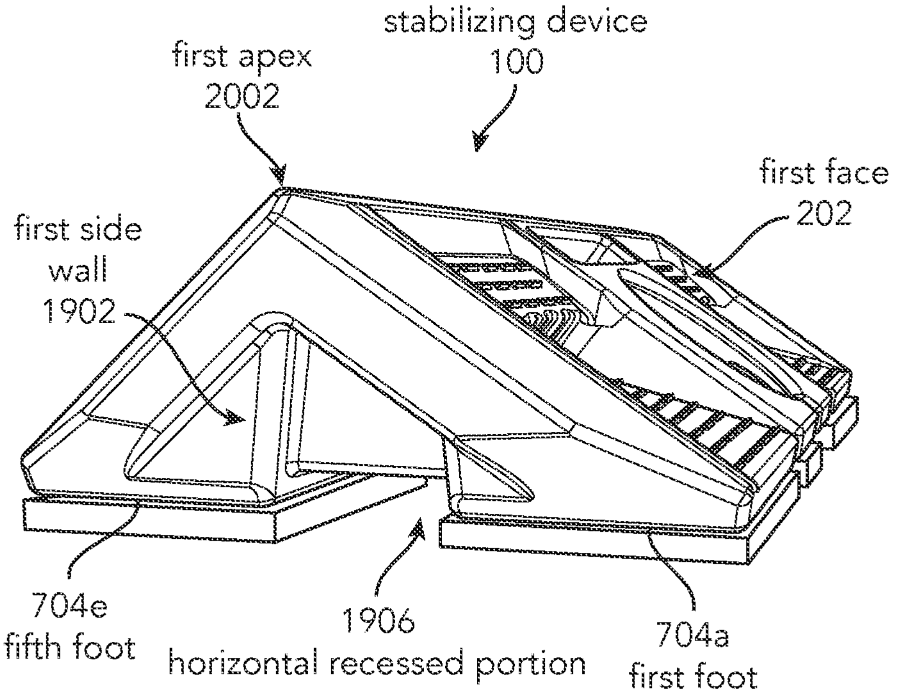
FIGS. 20A and 20B illustrate perspective views of the stabilizing device, according to some embodiments.

In some embodiments, the stabilizing device 100 includes a first side wall 1902 extending from the first foot 704*a* and the fifth foot 704*e* to a first apex 2002, shown in FIG. 20A, of the stabilizing device 100. The stabilizing device 100 may also include a second side wall 1904 extending from the fourth foot 704*d* and the eighth foot 704*h* to a second apex 2004, shown in FIG. 20B, of the stabilizing device 100. In some embodiments, the second apex 2004 is located opposite the first apex 2002 and the second side wall 1904 is located opposite the first side wall 1902. At least one of the first side wall 1902 and the second side wall 1904 may function as a handle for the user 10 to lift and carry the stabilizing device 100. The first side wall 1902 and the second side wall 1904 may be thought of as the "ends" of the stabilizing device 100.

Figure 20B:
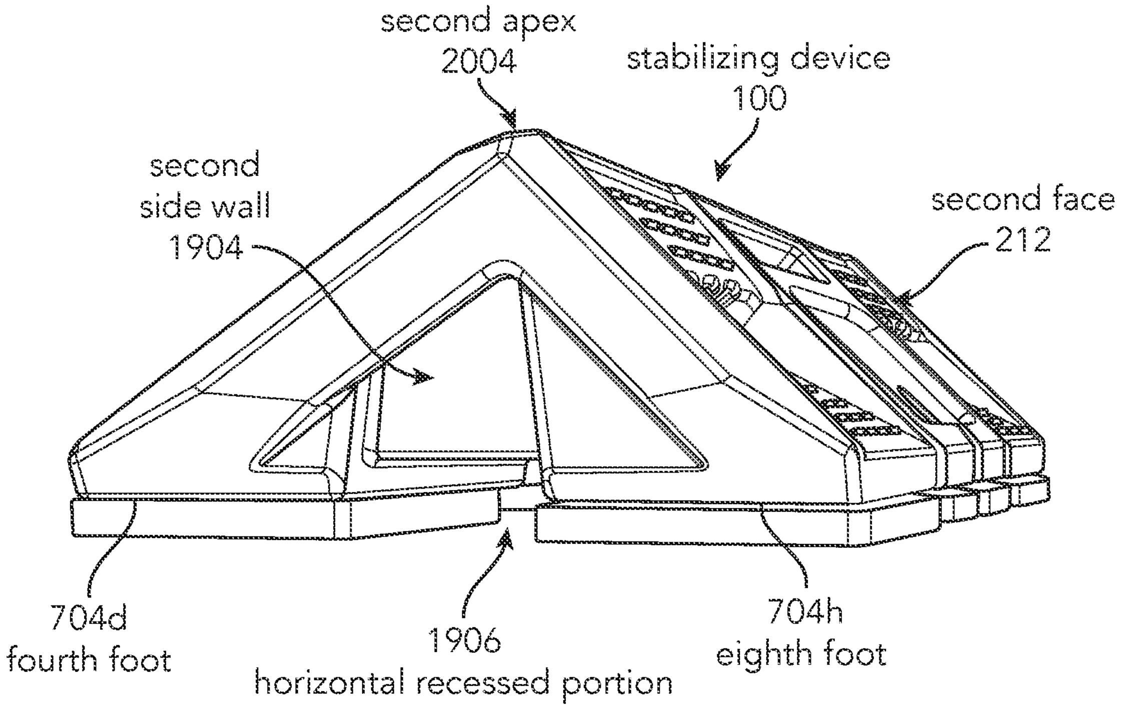

FIGS. 19, 20A, and 20B also show a horizontal recessed portion 1906. In some embodiments, the stabilizing device 100 includes a horizontal recessed portion 1906 extending along the first direction from the first side wall 1902 to the second side wall 1904. The horizontal recessed portion 1906 may be located between the first foot 704*a* and the fifth foot 704*e*, between the second foot 704*b* and the sixth foot 704*f*, between the third foot 704*c* and the seventh foot 704*g*, and between the fourth foot 704*d* and the eighth foot 704*h*. In some embodiments, the horizontal recessed portion 1906 bisects the gap 1702. The horizontal recessed portion 1906 may be arched to prevent tipping while the stabilizing device 100 is placed on sloped surfaces by keeping tension and force on the feet 704 of the device 100 rather than evenly across the whole base 104. The arch in the horizontal recessed portion 1906 may also help protect surfaces, such as roofing, flooring, outdoor ground surfaces, and the like, from the unpadded portion of the base 104.

Figure 21A:
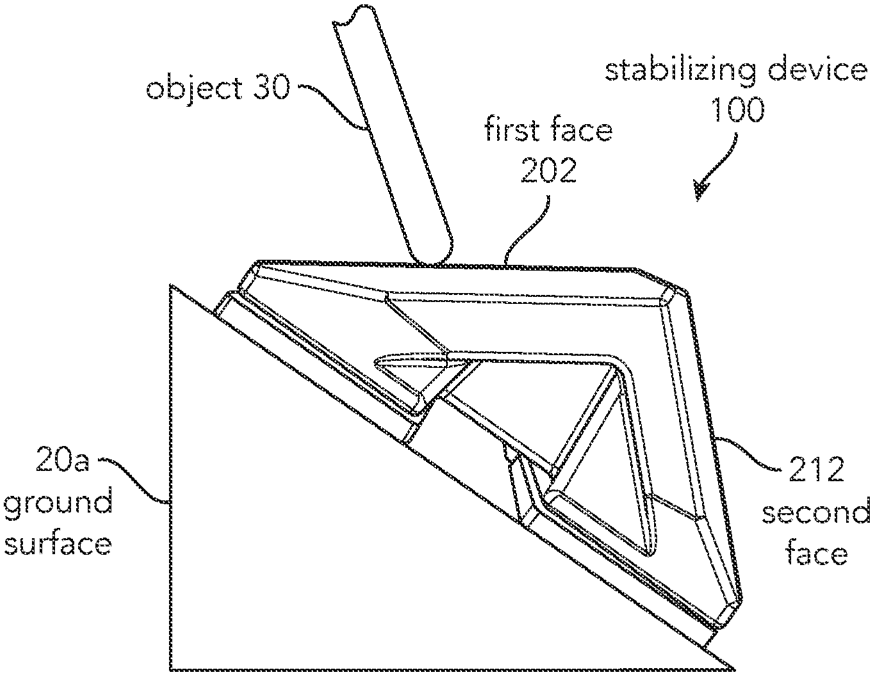
FIGS. 21A and 21B illustrate side views of the stabilizing device in use, according to some embodiments.
Figure 21B:
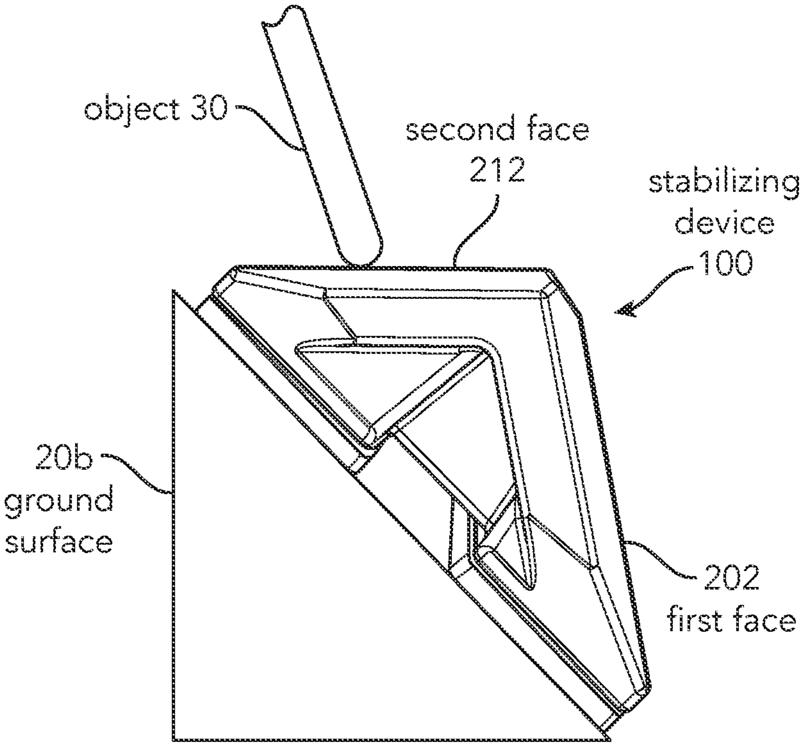

FIGS. 21A and 21B show side views of the stabilizing device 100 in use on a ground surface 20*a* and a ground surface 20*b*, respectively, where the ground surface 20*b* defines a steeper slope than the ground surface 20*a*. It should be noted that FIG. 21A shows a partial view of the ground surface 20*a*, and FIG. 21B shows a partial view of the ground surface 20*b*. As discussed with reference to FIGS. 4B and 5B, the first lower section 208 and the second lower section 218 may define different angles, with the first lower section 208 defining a smaller angle than the second lower section 218. Accordingly, it may be understood that the first face 202, including the first lower section 208, is sized and arranged for use on less steep slopes than the second face 212, which includes the second lower section 218. This idea is demonstrated by FIGS. 21A and 21B, where the lower-sloped ground surface 20*a* is aligned with the first face 202 while the steeper-sloped ground surface 20*b* is aligned with the second face 212.

As shown in FIG. 21A, when the first face 202 (i.e., the working surface of the stabilizing device 100 in this example) is matched with the slope of the ground surface 20*a*, the stabilizing device 100 provides a substantially level surface upon which to place an object 30, such as a ladder, or a user 10. This substantially level surface may be much safer and more stable than simply placing the user 10 or the object 30 on the sloped ground surface 20*a* without the stabilizing device 100.

Similarly, as shown in FIG. 21B, when the second face 212 (i.e., the working surface of the stabilizing device 100 in this example) is matched with the slope of the ground surface 20*b*, the stabilizing device 100 provides a substantially level surface upon which to place an object 30, such as a ladder, or a user 10. This substantially level surface may also be much safer and more stable than simply placing the user 10 or the object 30 on the sloped ground surface 20*b* without the stabilizing device 100.

It should be noted that the stabilizing device 100 may be used on several types of slopes both indoors and outdoors to support an object 20 or user 10. The inclusion of four different surfaces (i.e., the first upper ledge 204, the first lower section 208, the second upper ledge 214, and the second lower section 218) enables the stabilizing device 100 to accommodate several different working environments. It should be noted that the slope of any given ground surface 20, including the ground surfaces 20*a* and 20*b* shown in FIGS. 21A and 21B, does not have to exactly match one of the angles of the first upper ledge 204, the first lower section 208, the second upper ledge 214, or the second lower section 218.

Figure 22:
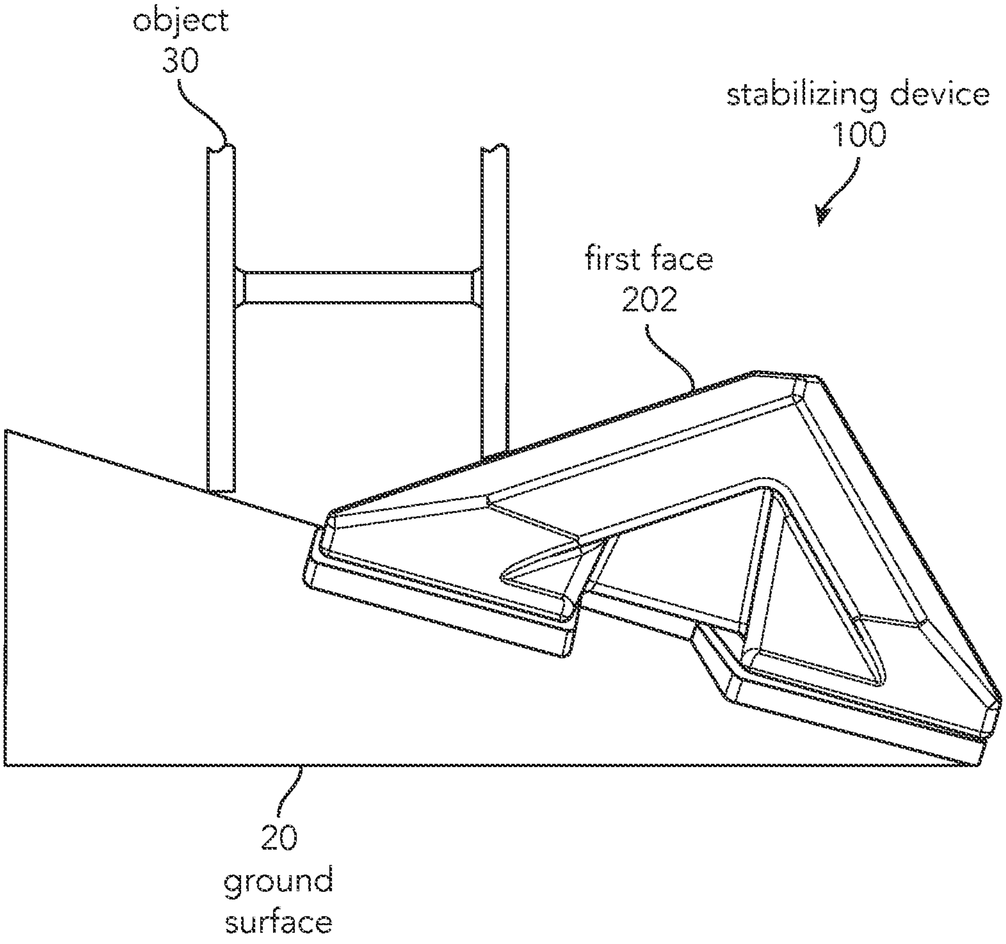
FIG. 22 illustrates a side view of the stabilizing device in use, according to some embodiments.

FIG. 22 illustrates the stabilizing device 100 in use and supporting an object 30 on an inclined ground surface 20. As shown in FIG. 22, the object 30 may be a ladder. The stabilizing device 100 may be configured to support an object 30, such as a ladder, in different orientations. For example, FIG. 22 shows one foot of the ladder contacting the ground surface 20, while the other foot rests on the first face 202 of the stabilizing device 100, such that the ladder is positioned perpendicular to the first face 202. In contrast, FIGS. 21A and 21B show the object 30, which may also be a ladder, positioned parallel to the stabilizing device 100. Stated differently, FIG. 21A may be thought of as showing a ladder positioned on the first face 202 such that one foot of the ladder is located on the first left lower section portion 304*a* and the other foot is located on the first right lower section portion 304*b*. Similarly, FIG. 21B may be thought of as showing a ladder positioned on the second face 212 such that one foot of the ladder is located on the second left lower section portion 308*a* and the other foot is located on the second right lower section portion 308*b*. It should be noted that though FIG. 22 specifically shows the object 30 resting on the ground surface 20 and the first face 202, the stabilizing device 100 may be configured to support the object 30 resting on the ground surface 20 and the second face 212.

Figure 23A:
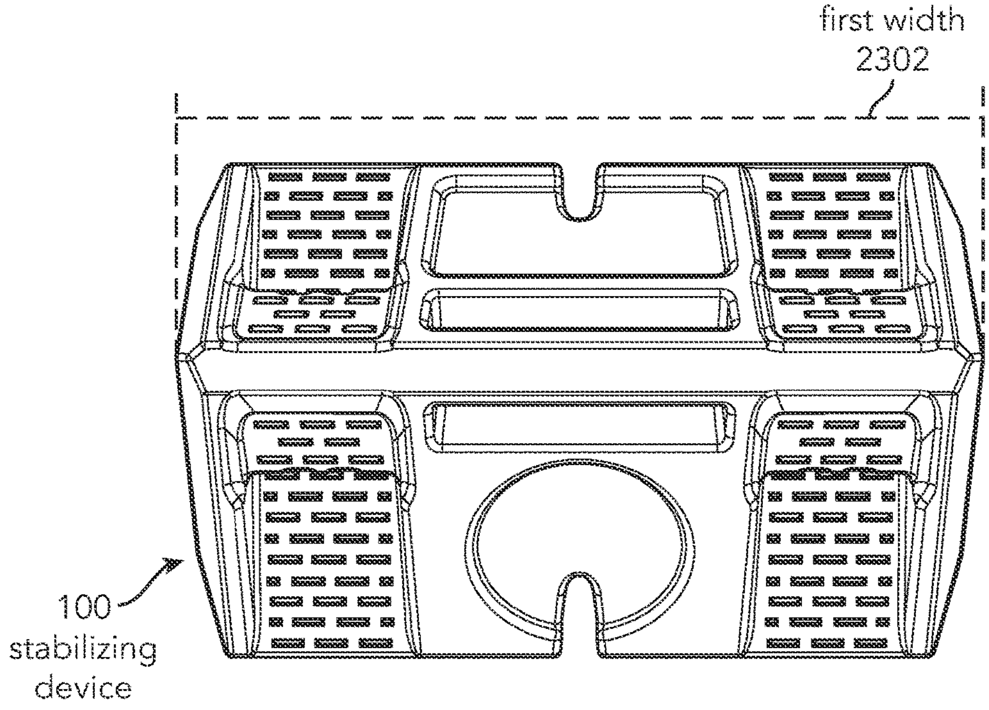
FIG. 23A illustrates a top view of a first embodiment of the stabilizing device, according to some embodiments.
Figure 23B:
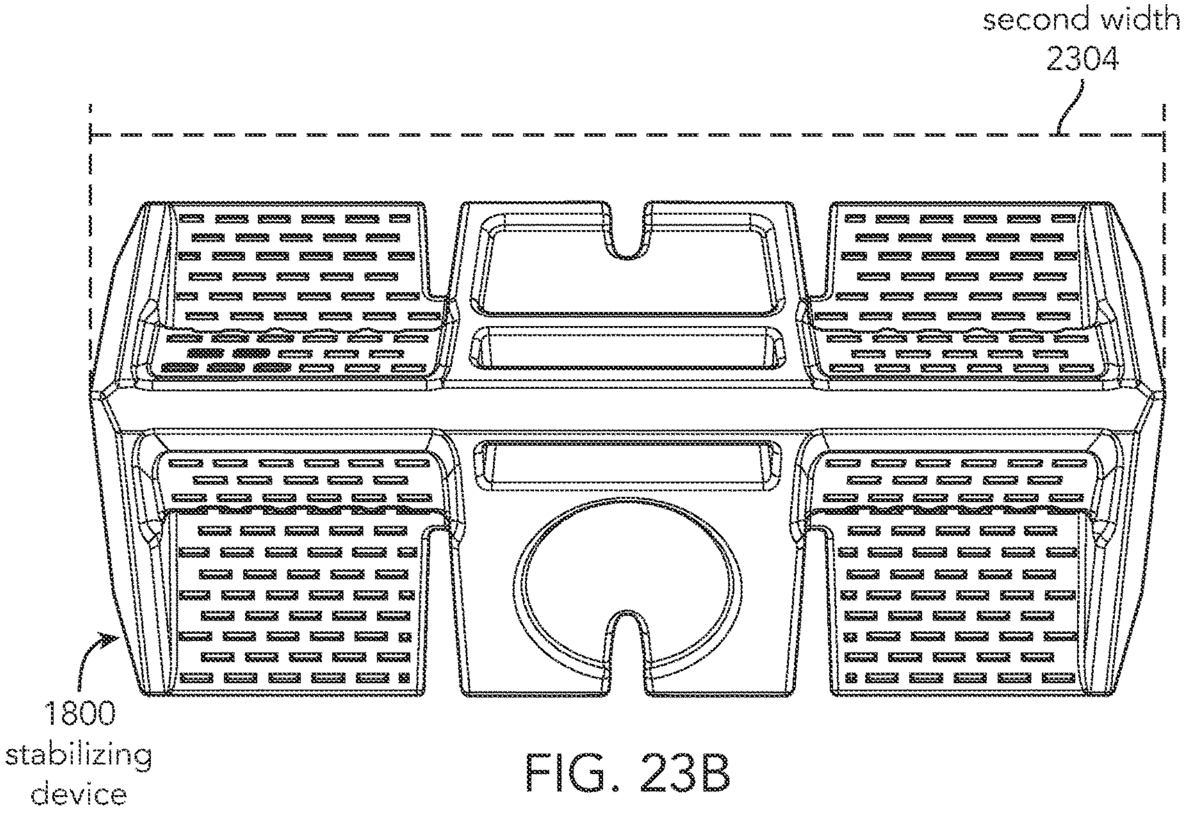
FIG. 23B illustrates a top view of a second embodiment of the stabilizing device, according to some embodiments.
Figure 24A:
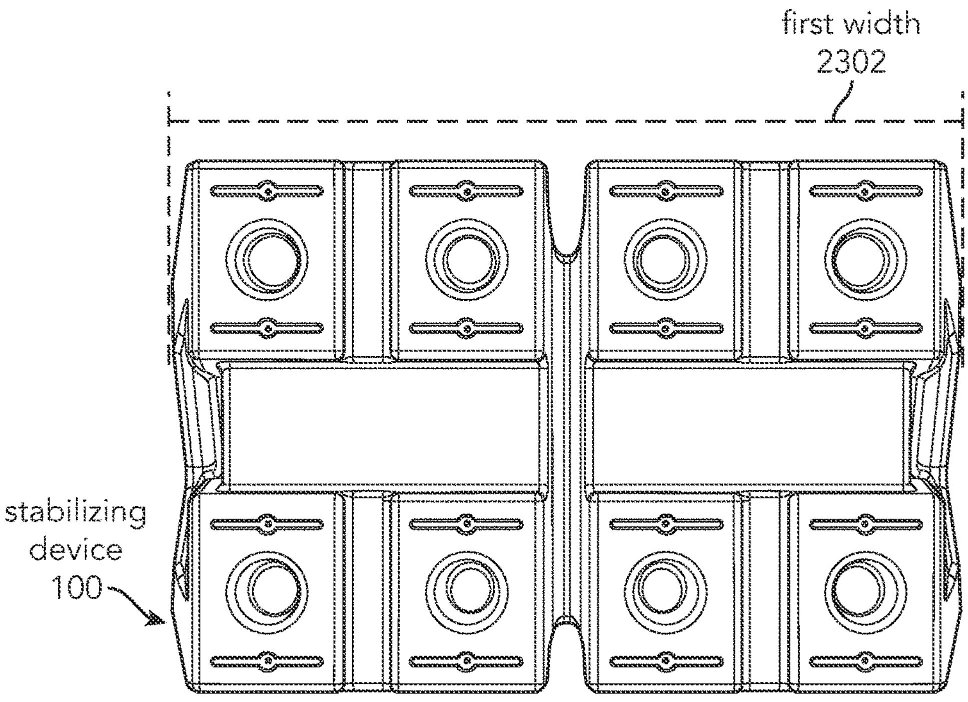
FIG. 24A illustrates a bottom view of the first embodiment of the stabilizing device, according to some embodiments.
Figure 24B:
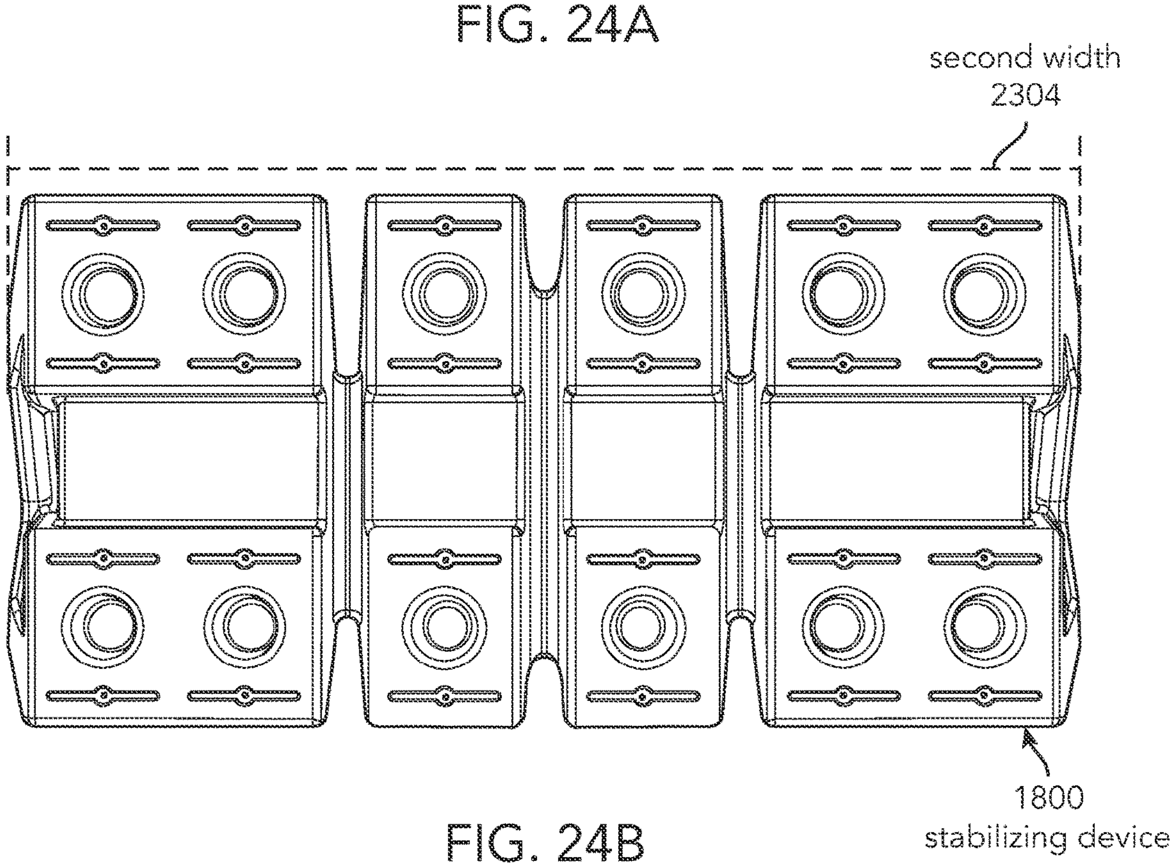
FIG. 24B illustrates a bottom view of the second embodiment of the stabilizing device, according to some embodiments.

FIGS. 23A and 23B illustrate top views of the stabilizing device 100 and the stabilizing device 1800, respectively. As demonstrated in FIG. 23A and FIG. 24A, the stabilizing device 100 may be defined by a first width 2302; conversely, FIG. 23B and FIG. 24B demonstrate that the stabilizing device 1800 may be defined by a second width 2304. In some embodiments, the first width 2302 is about 24.5 inches. In some embodiments, the second width 2304 is about 33 inches. The primary substantive differences between the stabilizing device 100 and the stabilizing device 1800 may be their widths and the quantity of the at least one foot 704, as shown in FIGS. 24A and 24B, which illustrate bottom views of the stabilizing device 100 and the stabilizing device 1800. All other dimensions (i.e., height and depth) may be equal between the stabilizing device 100 and the stabilizing device 1800. According to some embodiments, the height of the stabilizing device 100 and the stabilizing device 1800 is about 7 inches. According to some embodiments, the depth of the stabilizing device 100 and the stabilizing device 1800 is about 16 inches. In this disclosure, the term "about" is used to mean "approximately" and includes a tolerance of +/−5 inches.

In some embodiments, the stabilizing device 100 is configured to be compatible with standard extension and extendable ladders. The stabilizing device 1800 may be configured to be compatible with larger-sized step ladders and multi-position ladders; generally, ladders with a wider base than would fit on the stabilizing device 100. It should be noted that though FIGS. 1-17 and 19-22 were discussed in terms of the stabilizing device 100 and various features of the stabilizing device 100; the preceding discussion may also apply to the stabilizing device 1800. For example, the stabilizing device 1800 may include a foot that is substantially the same as the foot 704 and couples to a foam rubber pad that is substantially similar to the foam rubber pad 902. In addition, like the stabilizing device 100, the stabilizing device 1800 may include a first face with a first upper ledge, a first lower section, and a first middle portion and a second face with a second upper ledge, a second lower section, and a second middle portion.

In some embodiments, multiple stabilizing devices 100 (or multiple stabilizing devices 1800, or a combination of a stabilizing device 100 and a stabilizing device 1800) may be used to support a single object. For example, when using a work table on a sloped surface, a user 10 may position a stabilizing device 100 (or a stabilizing device 1800) under each leg of the downslope portion of the table to bring the table up to a more level surface with the upslope portion.

Figure 25:
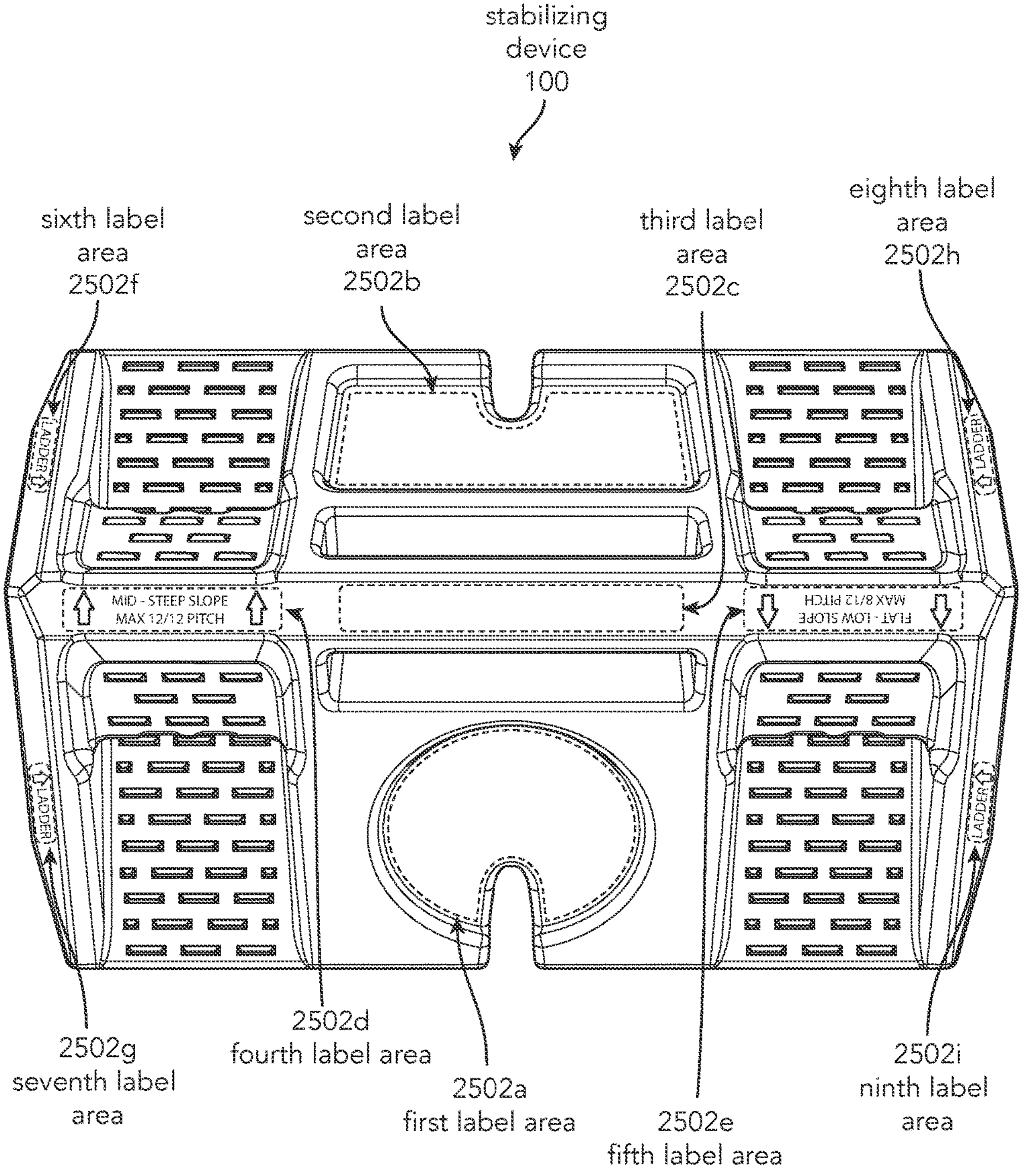
FIG. 25 illustrates a top view of a stabilizing device including labeling, according to some embodiments.

FIG. 25 shows a top view of the stabilizing device 100 and includes label areas 2502, including a first label area 2502*a*, a second label area 2502*b*, and a third label area 2502*c*. In some embodiments, the first label area 2502*a* is located within the first recessed surface 604 and the second label area 2502*b* is located within the second recessed surface 610. The first label area 2502*a* and/or the second label area 2502*b* may include labeling having logo(s), product instructions, product information, user warnings, and the like. The third label area 2502*c* may also include labeling having logo(s), product instructions, product information, user warnings, and the like. Any text or images in the first label area 2502*a*, the second label area 2502*b*, and/or the third label area 2502*c* may define raised (i.e., embossed) text or images. In some embodiments, any text or images in the first label area 2502*a*, the second label area 2502*b*, and/or the third label area 2502*c* defines etched, including laser-etched (i.e., debossed), text or images. Any text or images in the first label area 2502*a*, the second label area 2502*b*, and/or the third label area 2502*c* may define printed text or images with no significant texture, such as that printed directly on the device 100 or printed on a sticker and applied to the device 100.

FIG. 25 also shows that, in some embodiments, the stabilizing device 100 includes additional label areas 2502 with information and user instructions around the shell 102. For example, a top surface of the stabilizing device 100 may include a fourth label area 2502*d* with the text "MID-STEEP SLOPE MAX 12/12 PITCH" and a fifth label area 2502*e* with the text "FLAT-LOW SLOPE MAX 8/12 PITCH" with arrows pointing to the applicable face 202, 212 of the device 100. In this example, the arrows may be used to indicate that the first face 202 is appropriate for use on a "FLAT-LOW SLOPE" with a "MAX 8/12 PITCH" and that the second face 212 is appropriate for use on a "MID-STEEP SLOPE" with a "MAX 12/12 PITCH." The stabilizing device 100 may also include a sixth label area 2502*f*, a seventh label area 2502*g*, an eighth label area 2502*h*, and a ninth label area 2502*i*, each with the word "LADDER" with an arrow pointing toward each of the first left lower section portion 304*a*, the first right lower section portion 304*b*, the second left lower section portion 308*a*, and the second right lower section portion 308*b* to indicate the appropriate locations for ladder feet. The text and arrows shown in FIG. 25 may be raised (i.e., embossed), etched (i.e., laser-etched or debossed), or substantially flat along the shell 102. The stabilizing device 1800 may include any one or a combination of the label areas 2502 shown in FIG. 25.

In some embodiments, the disclosure includes a method of using the stabilizing device 100 (or the stabilizing device 1800) to increase friction between an object 30 and a flat or sloped ground surface 20. The method may include placing the stabilizing device 100 (or the stabilizing device 1800) on the ground surface 20, sliding the device 100 (or the device 1800) into a desired position, and placing the object 30 on top of the stabilizing device 100 (or the stabilizing device 1800). In some embodiments, placing the object 30 on the stabilizing device 100 (or the stabilizing device 1800) compresses the foam rubber pad 902, thereby creating a suction-like seal between the device 100 (or the device 1800) and the ground surface 20. When a user 10 wishes to move the device 100 (or the device 1800), the object 30 should be removed from the device 100 (or the device 1800), thereby allowing the foam rubber pad 902 to revert to an uncompressed state to break the seal between the device 100 (or the device 1800) and the ground surface 20. Once the compressive force is removed from the device 100 (or the device 1800), the device 100 (or the device 1800) can be easily lifted, slid, or otherwise moved into a different position. The use of the stabilizing device 100 (or the stabilizing device 1800) may increase friction between the object 30 and the ground surface 20 by virtue of the nature of the foam rubber pad 902. The use of the stabilizing device 100 (or the stabilizing device 1800) may also distribute the weight of the object 30 over a greater area of the ground surface 20 and help reduce the risk of damage to the ground surface 20.

Some of the components listed herein use the same number from figure to figure. It should be appreciated these components use the same numbers solely for ease of reference and to facilitate comprehension for the reader. While these components may use the same numbers, differences may be present in these components as illustrated in the various figures in which they appear and as described in the specification herein.

None of the steps described herein is essential or indispensable. Any of the steps can be adjusted or modified.

Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

The term "substantially" is used to mean "completely or nearly completely." For example, the disclosure includes the following: "the stabilizing device 100 . . . when placed on a sloped surface, provides a substantially level surface for a user 10 to stand on." In this context, the term "substantially level" means that the surface may be completely or nearly completely level, but is not required to be 100% level.

The term "mechanically" is used to mean "by means of a machine or machinery." A person having ordinary skills in the art will understand this ordinary dictionary meaning.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. A stabilizing device, comprising:

a shell;

a base located on a bottom portion of the shell, the base configured to contact a ground surface;

a first face extending at an angle with respect to the base, the first face comprising a first upper ledge comprising a first textured surface and a first lower section comprising a second textured surface;

a second face extending at an angle with respect to the base and the first face, the second face comprising a second upper ledge comprising a third textured surface and a second lower section comprising a fourth textured surface, wherein the first face and the second face are configured to support at least one object;

a foot located along the base;

a foam rubber pad removably coupled to the foot;

a first left upper ledge portion and a first right upper ledge portion spaced from the first left upper ledge portion;

a first left lower section portion and a first right lower section portion spaced from the first left lower section portion;

a second left upper ledge portion and a second right upper ledge portion spaced from the second left upper ledge portion;

a second left lower section portion and a second right lower section portion spaced from the second left lower section portion;

a first middle portion located along the first face and between the first left upper ledge portion and the first right upper ledge portion and between the first left lower section portion and the first right lower section portion:

a second middle portion located along the second face, and between the second left upper ledge portion and the second right upper ledge portion and between the second left lower section portion and the second right lower section portion;

a first handle located within the first middle portion and between the first left upper ledge portion and the first right upper ledge portion; and a second handle located within the second middle portion and between the second left upper ledge portion and the second right upper ledge portion.

2. The stabilizing device of claim 1, wherein the foam rubber pad is arranged and configured to create a suction-like seal with the ground surface when the foam rubber pad is compressed, and wherein the foam rubber pad is arranged and configured to slide along the ground surface when the foam rubber pad is not compressed.

3. The stabilizing device of claim 1, further comprising a plate mechanically coupled to the foot, the plate located between the foot and the foam rubber pad, wherein the foam rubber pad is removably coupled to the plate via a hook and loop connection.

4. The stabilizing device of claim 3, wherein the hook and loop connection comprises a hook connection injection molded into the plate and a loop connection adhesively coupled to the foam rubber pad.

5. The stabilizing device of claim 1, wherein the first textured surface, the second textured surface, the third textured surface, and the fourth textured surface each comprise a plurality of raised portions.

6. The stabilizing device of claim 5, wherein the first textured surface, the second textured surface, the third textured surface, and the fourth textured surface comprise substantially the same pattern.

7. The stabilizing device of claim 5, wherein the first textured surface, the second textured surface, the third textured surface, and the fourth textured surface comprise different patterns.

8. The stabilizing device of claim 1, further comprising an internal support structure located within the shell, the internal support structure comprising a bolster configured to provide support to at least one of the first left lower section portion, the first right lower section portion, the second left lower section portion, and the second right lower section portion.

9. The stabilizing device of claim 8, wherein the bolster extends from the foot to an internal portion of at least one of the first left lower section portion, the first right lower section portion, the second left lower section portion, and the second right lower section portion.

10. The stabilizing device of claim 1, wherein the first left upper ledge portion and the first right upper ledge portion define a first angle with respect to the base, wherein the first left lower section portion and the first right lower section portion define a second angle with respect to the base, wherein the second left upper ledge portion and the second right upper ledge portion define a third angle with respect to the base, and wherein the second left lower section portion and the second right lower section portion define a fourth angle with respect to the base.

11. The stabilizing device of claim 10, wherein the first angle is about 39 degrees, the second angle is about 15 degrees, the third angle is about 50 degrees, and the fourth angle is about 25 degrees.

12. The stabilizing device of claim 1, further comprising a first recessed surface located within the first middle portion and a second recessed surface located within the second middle portion.

13. The stabilizing device of claim 12, wherein the first recessed surface comprises a rounded recessed surface and wherein the second recessed surface comprises a rectangular recessed surface.

14. The stabilizing device of claim 1, comprising a gap located along the base, the gap extending from the first face to the second face, the gap arranged and configured to receive a metal roof seam.

15. The stabilizing device of claim 14, wherein the gap comprises a first gap, the stabilizing device further comprising:

a second gap located along the base, the second gap extending from the first face to the second face, the second gap spaced from the first gap; and a third gap located along the base, the third gap extending from the first face to the second face, the third gap spaced from the first gap and the second gap, wherein the first gap is located between the second gap and the third gap such that the first gap, the second gap, and the third gap are arranged and configured to receive a metal roof having a 12-inch seam and a metal roof having a 16-inch seam.

16. The stabilizing device of claim 1, wherein the foot comprises a first foot, the stabilizing device further comprising:

a second foot spaced from the first foot along a first direction;

a third foot spaced from the second foot along the first direction;

a fourth foot spaced from the third foot along the first direction;

a fifth foot spaced from the first foot along a second direction perpendicular to the first direction;

a sixth foot spaced from the fifth foot along the first direction and spaced from the second foot along the second direction;

a seventh foot spaced from the sixth foot along the first direction and spaced from the third foot along the second direction;

an eighth foot spaced from the seventh foot along the first direction and spaced from the fourth foot along the second direction;

a first side wall extending from the first foot and the fifth foot to a first apex of the stabilizing device;

a second side wall extending from the fourth foot and the eighth foot to a second apex of the stabilizing device, wherein the second apex is located opposite the first apex and wherein the second side wall is located opposite the first side wall; and a horizontal recessed portion extending along the first direction from the first side wall to the second side wall, the horizontal recessed portion located between the first foot and the fifth foot, the second foot and the sixth foot, the third foot and the seventh foot, and the fourth foot and the eighth foot.

17. The stabilizing device of claim 1, further comprising a plurality of label areas located on the shell, wherein each label area of the plurality of label areas is configured to receive a label containing user instructions.

18. The stabilizing device of claim 1, wherein the at least one object comprises a ladder.

19. The stabilizing device of claim 18, wherein when the first face supports the ladder, a first foot of the ladder is configured to rest on the first left lower section portion and a second foot of the ladder is configured to rest on the first right lower section portion.

20. The stabilizing device of claim 18, wherein when the second face supports the ladder, a first foot of the ladder is configured to rest on the second left lower section portion and a second foot of the ladder is configured to rest on the second right lower section portion.

* * * * *